Sept. 3, 1946.   A. W. FARRALL   2,406,819
BUTTER MANUFACTURE
Filed June 12, 1944   8 Sheets-Sheet 1
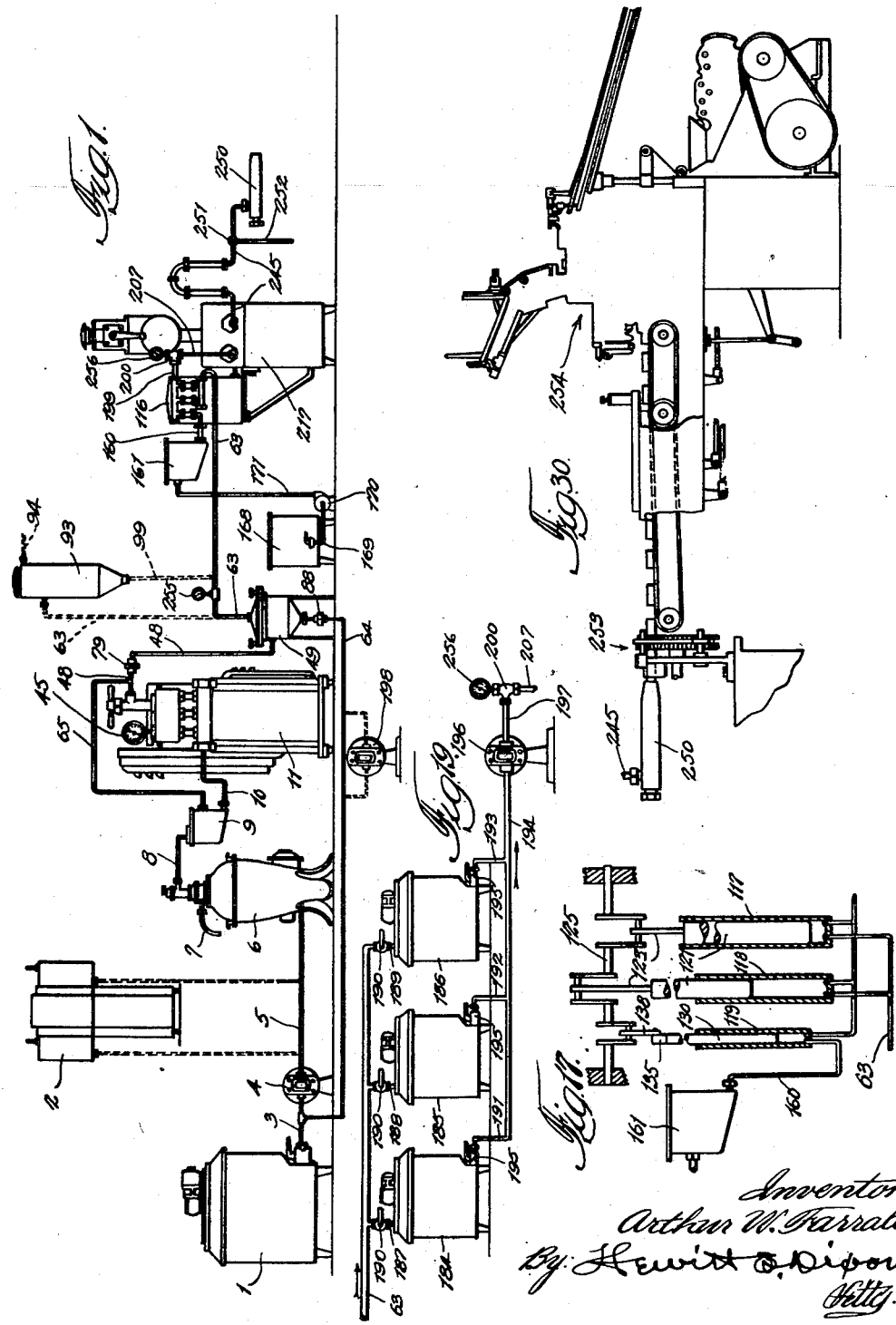

Sept. 3, 1946.  A. W. FARRALL  2,406,819
BUTTER MANUFACTURE
Filed June 12, 1944  8 Sheets-Sheet 2
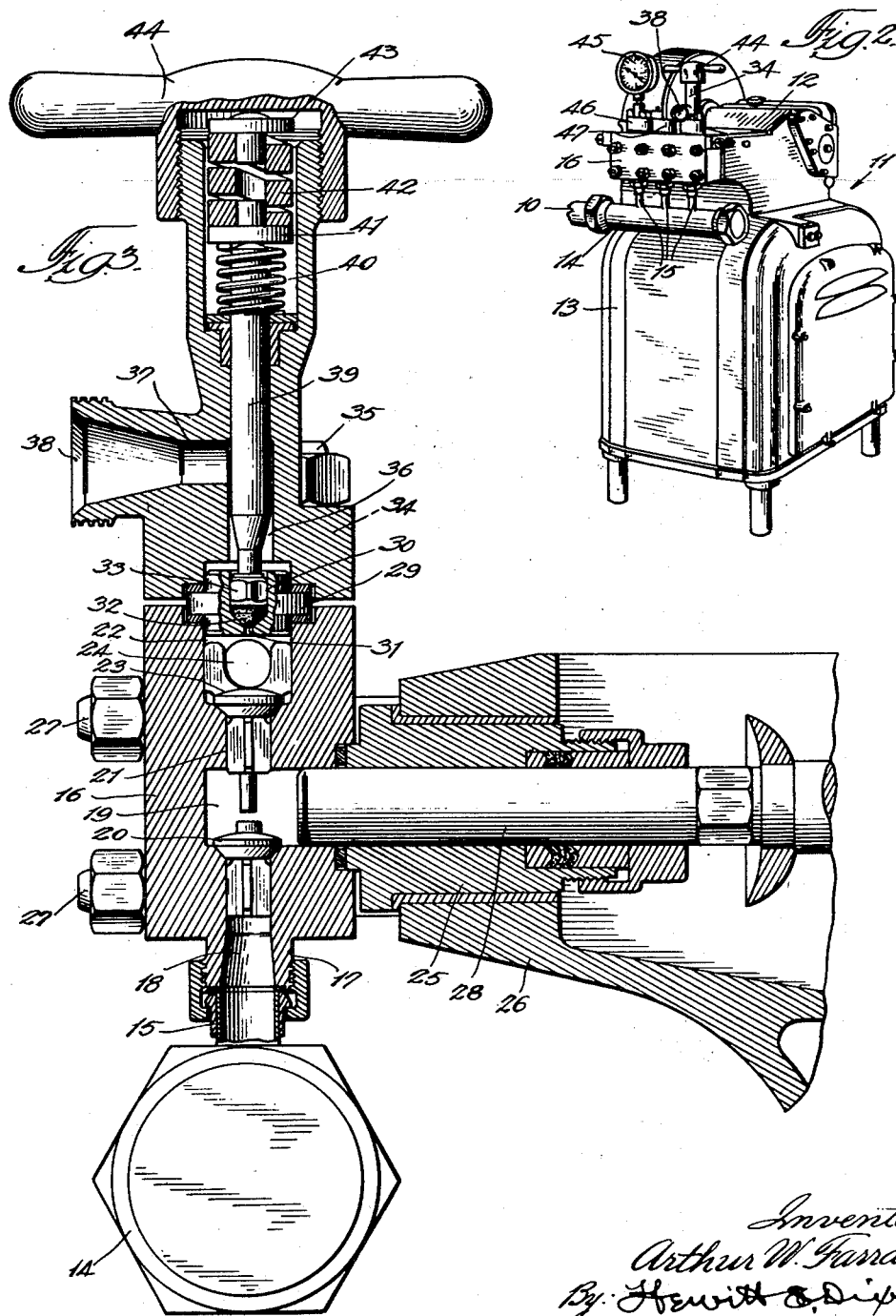

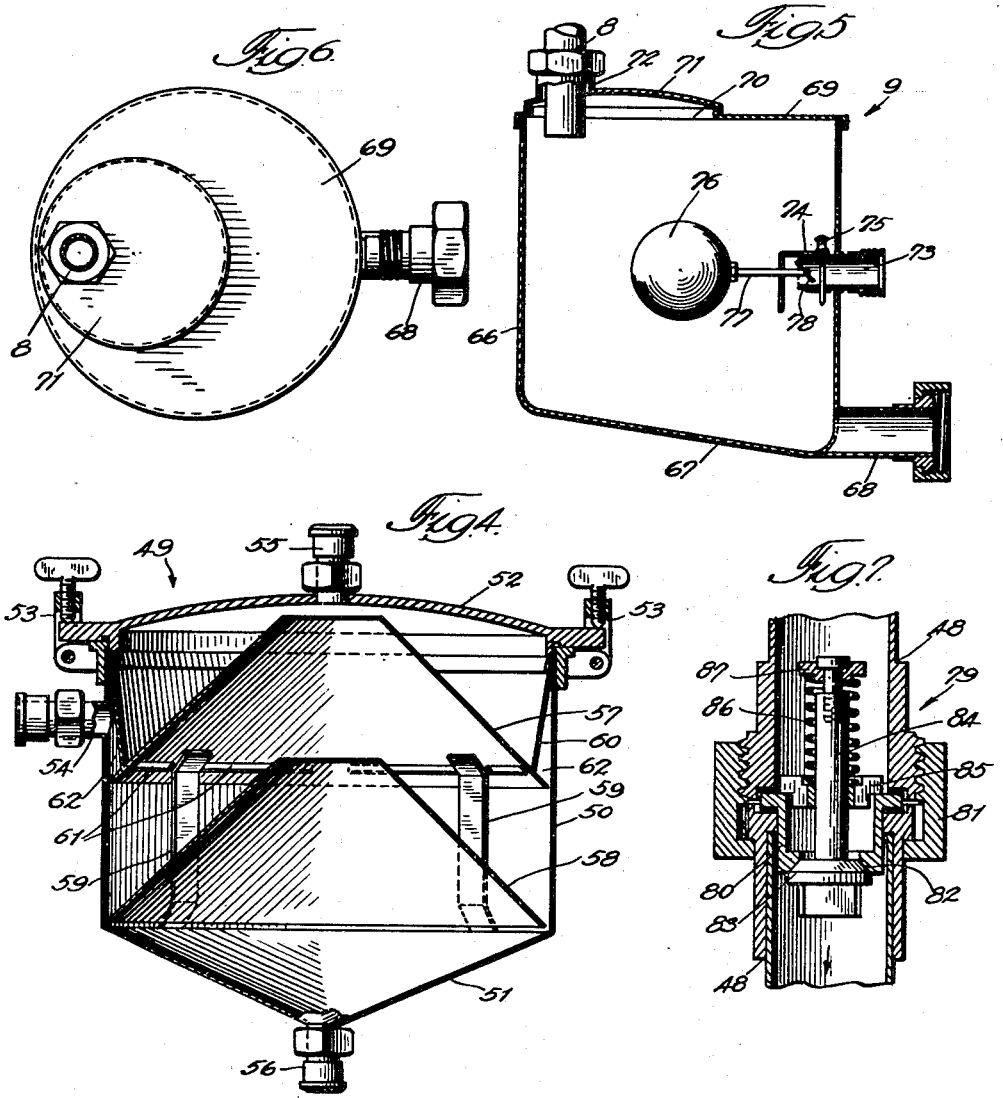

Sept. 3, 1946.  A. W. FARRALL  2,406,819
BUTTER MANUFACTURE
Filed June 12, 1944  8 Sheets-Sheet 4
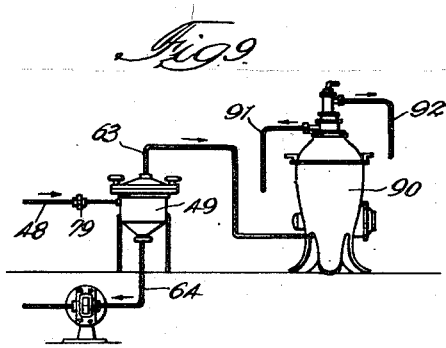
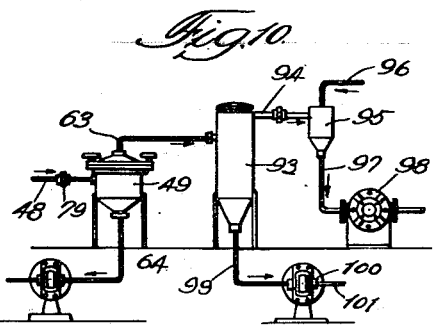
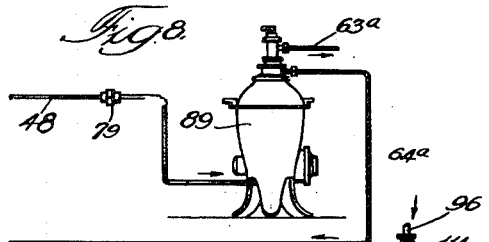
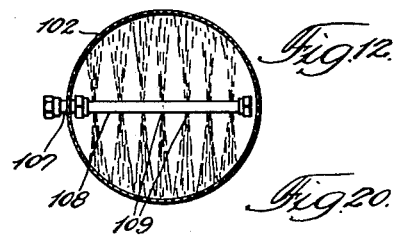
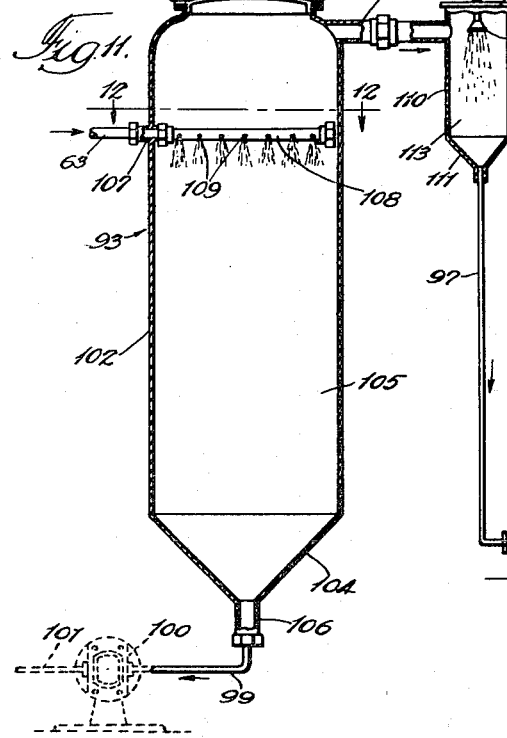
Inventor:
Arthur W. Farrall

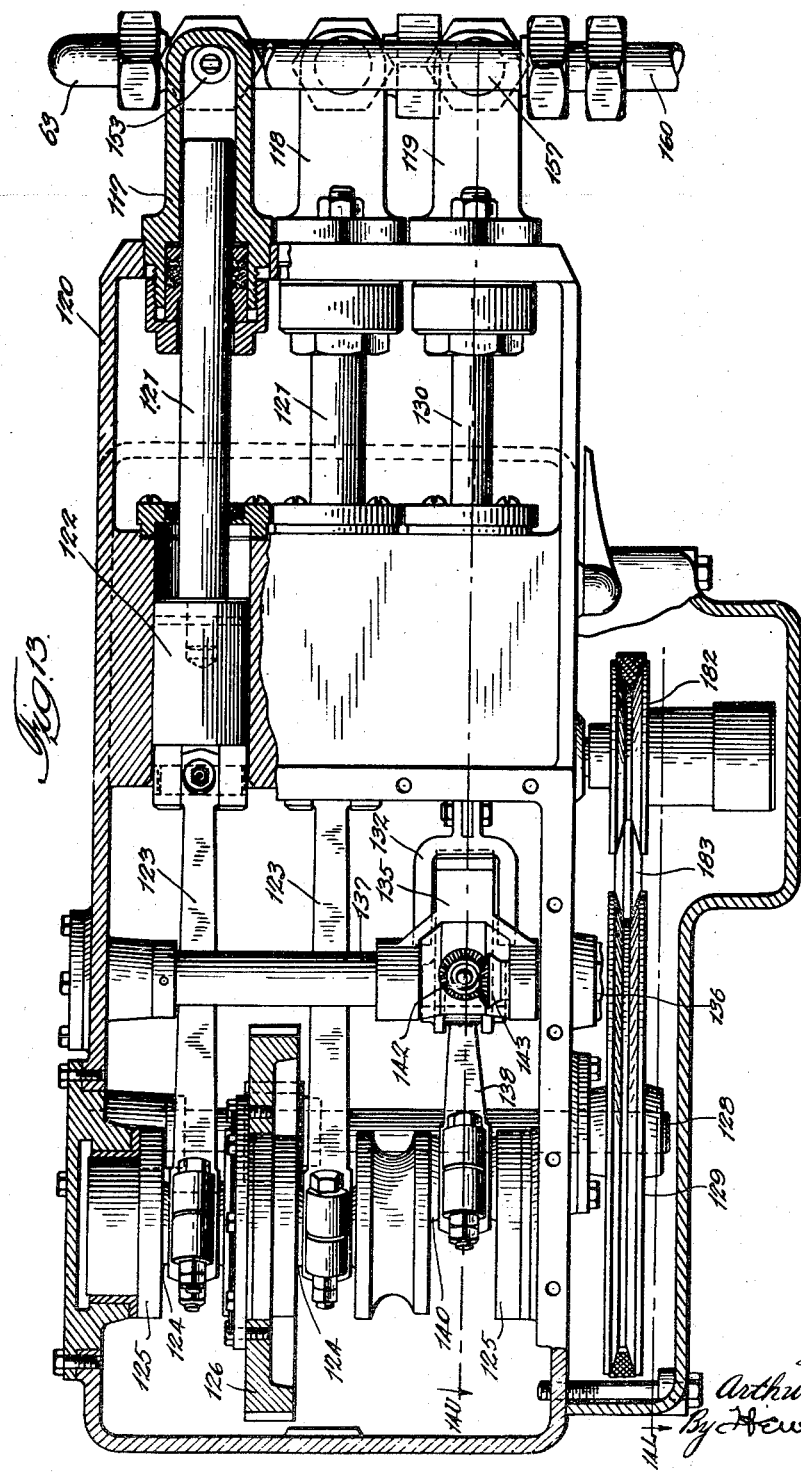

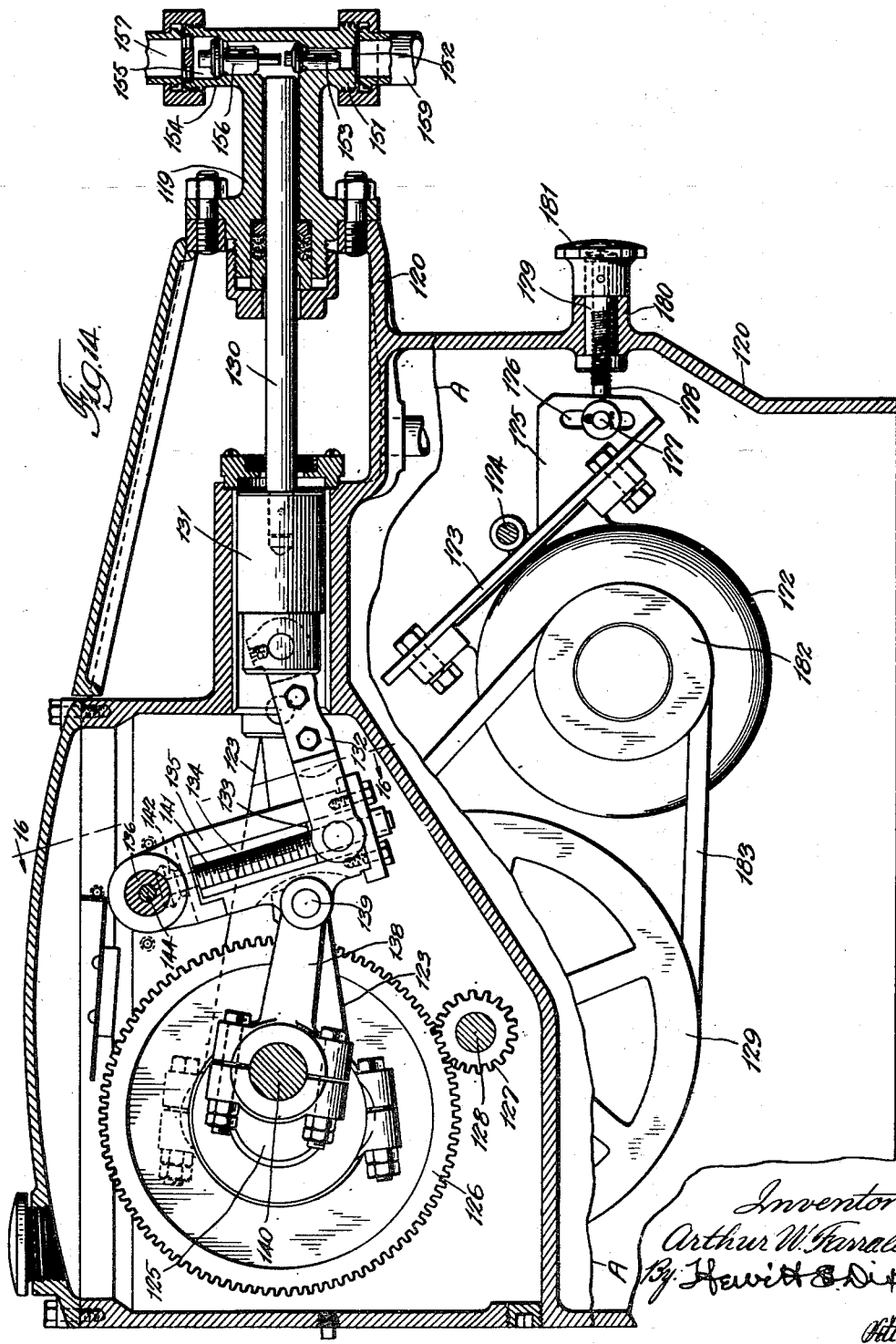

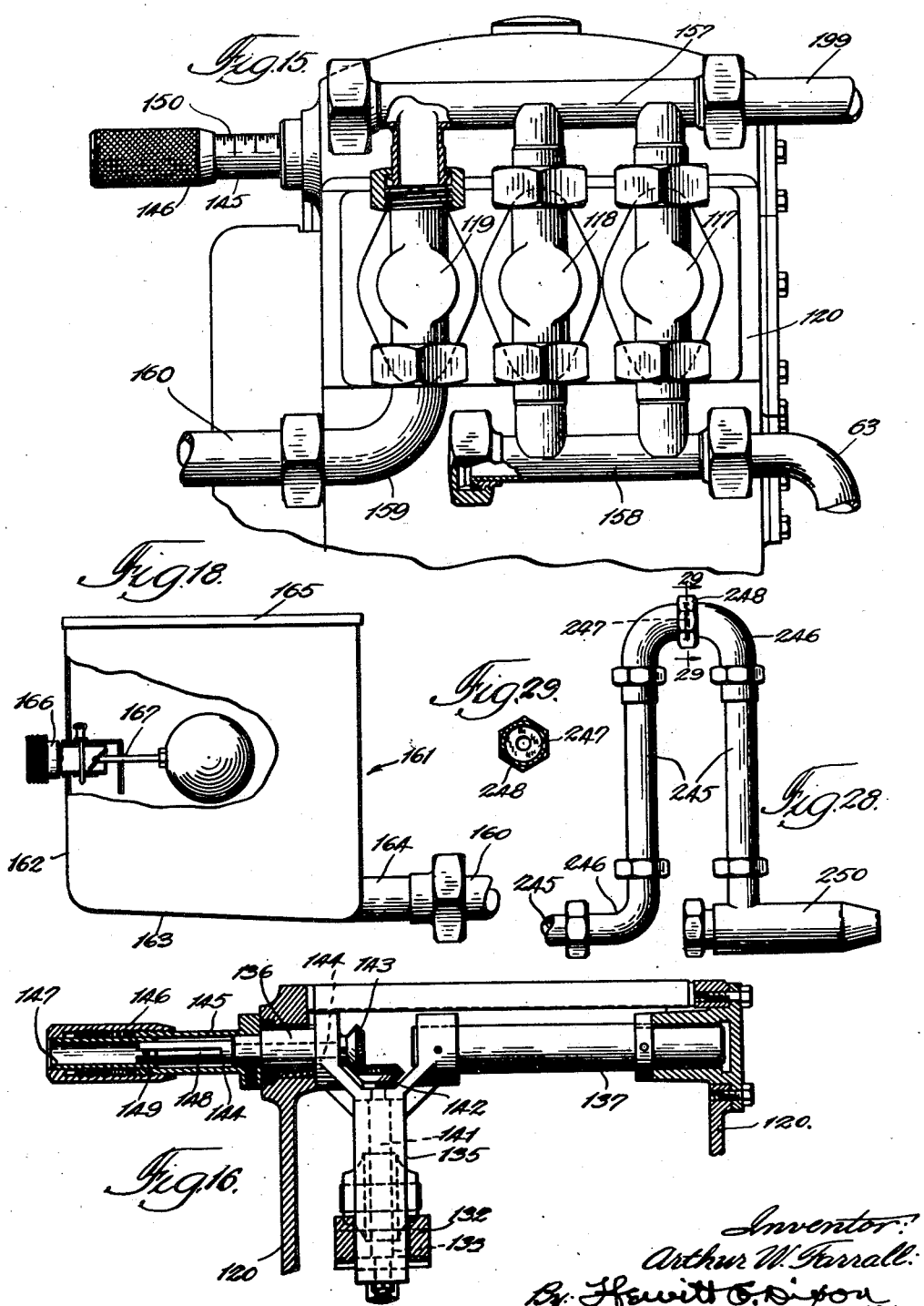

Sept. 3, 1946.  A. W. FARRALL  2,406,819
BUTTER MANUFACTURE
Filed June 12, 1944  8 Sheets-Sheet 8
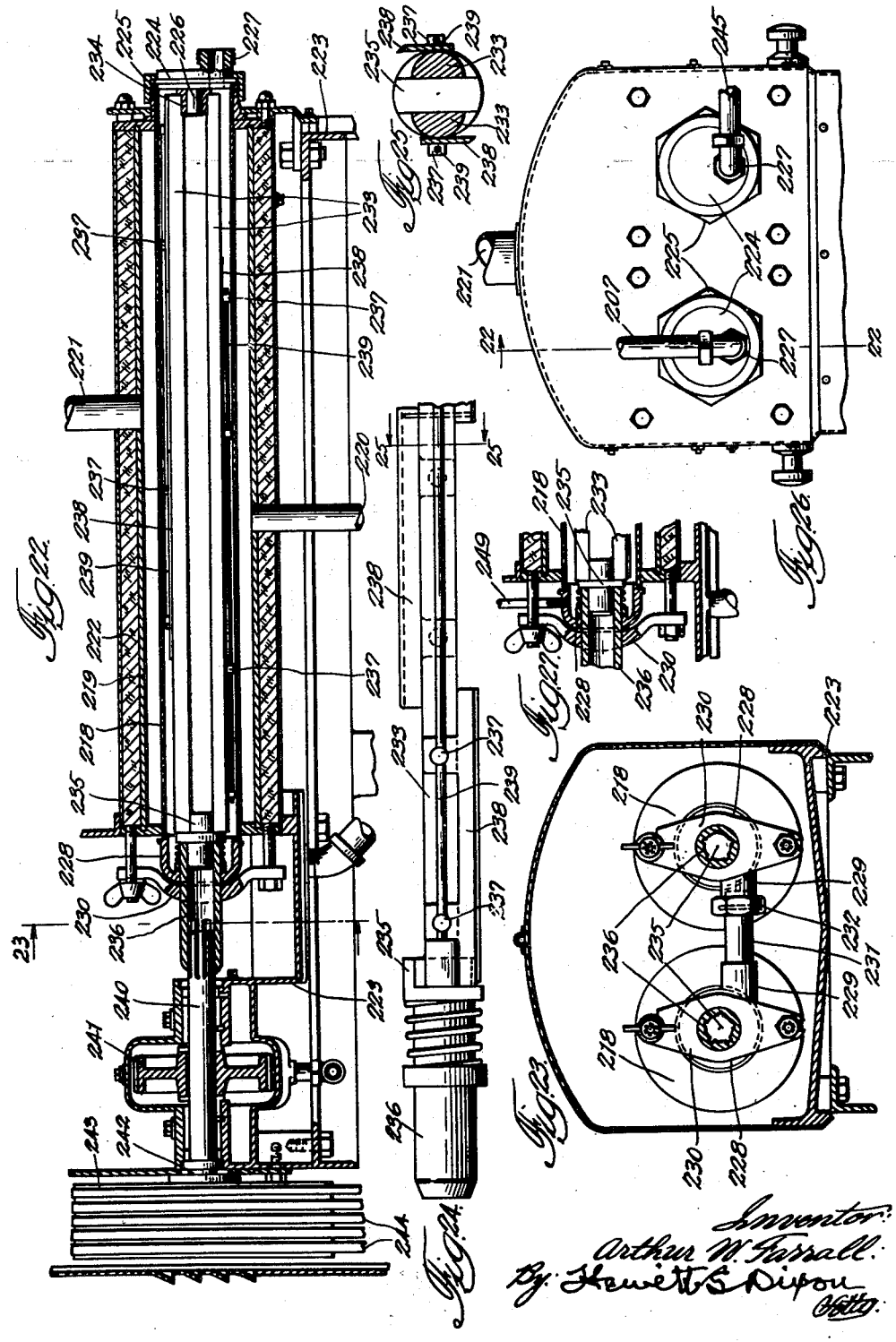

Patented Sept. 3, 1946

2,406,819

UNITED STATES PATENT OFFICE 2,406,819

BUTTER MANUFACTURE

Arthur W. Farrall, Wilmette, Ill., assignor to The Creamery Package Mfg. Company, Chicago, Ill., a corporation of Illinois Application June 12, 1944, Serial No. 539,969

32 Claims. (Cl. 99—119)

The invention relates to the manufacture of butter by continuous process. The primary object of the invention is to provide an efficient, sanitary and economical method for producing a superior quality of butter by continuously processing a flowing stream of cream to exhaustively separate the milk fat with effective conservation of all of the cream constituents, to constitute a butter composition with accurately controlled selective proportions of the separated fat and the required nonfat butter components, and to controllably work the composition into finished butter having in high degree the consumer desired characteristics in body, texture, flavor and aroma. Another object of the invention is to provide a method by which a flowing stream of cream is in part similarly processed to produce dehydrated butter oil suitable for intermediate storage, and subsequent further processing for the production of butter and other food products. The invention provides for the accomplishment of these objects without resorting to the dilution of the cream with water to facilitate separation of the butter fat from the cream, nor to the addition of any other substances intended for that purpose.

The conventional method of producing butter is of ancient origin, being that of subjecting a batch of milk or cream to violent agitation for a considerable period of time to cause the normally dispersed plastic fat particles to coalesce and separate from the milk serum in free granules which subsequently are worked into a mass of butter. As practiced in the modern butter churn and worker of the batch type, the conventional method produces excellent butter, but the requirements of commercial practice demand improvements in efficiency of time and labor expended, in preservation of sanitary conditions, in effectiveness of operating controls for quality and uniformity of product, in recovery of fat and by-products, and in other respects known to butter manufacturers.

Milk is a natural emulsion of minute globules of fat dispersed in a colloidal solution of proteins in water, the solution being known as serum. Cream is a similar emulsion containing the fat in concentrated proportion. Cream is obtained by separating the fat with a portion of the serum from the remaining substantially fat-free serum or skim milk. In both milk and cream, the emulsion comprises the fat globules in dispersed phase and the serum in continuous phase, otherwise described as a fat-in-serum emulsion. The complex physical properties of both fat and serum contribute substantial stability to the emulsion in resistance to release and separation of the fat from the serum. In its essentials, butter making comprises breaking the normal cream fat-in-serum emulsion for release of the fat, and reconstituting an emulsion of the fat with a portion of the serum in reversed relation wherein the serum is in dispersed phase and the fat is in continuous phase, or a serum-in-fat emulsion.

The difficulties of commercial butter manufacture arise largely in accomplishing this conversion by sanitary means in short time and with accurate control, without appreciable loss of fat in the surplus serum, and without sacrificing any of the inherent characteristics essential to the flavor, aroma and texture of the butter, nor losing any of the valuable by-products of the surplus serum. Efforts heretofore made to improve upon the conventional method of butter making have been short of success because of failure of better results in overcoming these difficulties.

The present invention provides a continuous process by which a flowing stream of normal churning cream, heated to a temperature at least sufficient to melt the fat contained in the cream, is centrifuged for fat concentration within the range of efficient and uniform separation by such means; the concentrated cream fat-in-serum emulsion is broken into a de-stabilized freely separable mixture of liquid fat and serum in reversed phase relation with the fat in continuous phase; serum is withdrawn to effect further fat concentration to a degree above that in butter; salt solution, serum solids and other desired ingredients are added as desired to the fat and remaining serum to make the requisite butter composition; the reversed phase mixture of fat and serum with added ingredients is re-emulsified in serum-in-fat relation; and the reconstituted emulsion is chilled, re-stabilized and worked into finished butter.

The invention further provides for practice of the foregoing process in part by which a flowing stream of normal churning cream, heated to a temperature at least sufficient to melt the fat contained in the cream, is centrifuged for fat concentration within the range of efficient and uniform separation by such means; the concentrated cream fat-in-serum emulsion is broken into a de-stabilized freely separable mixture of liquid fat and serum in reversed phase relation with the fat in continuous phase; serum is withdrawn to effect further fat concentration to a degree above that in butter; and the remaining serum is extracted to an extent substantially eliminating moisture from the fat and producing dehydrated butter oil.

All of the operations are performed upon the continuously flowing product within enclosed machines and conduits without exposure to atmosphere or manual handling. Highly sanitary conditions prevail throughout the process. There is no dilution of the product with water or any other liquid or substance for purposes of separation or washing of the fat. By-product values are not wasted. Fat losses are substantially reduced. All operations are readily controllable to select and uniformly maintain the desired composition, body and texture of the butter. Without dilution, exposure to atmosphere or evaporation, the volatile elements contributing desired flavor and aroma are preserved in high degree. The time cycle involved is much less than in conventional butter production, and the continuous operations proceed without critical variations from predetermined control conditions. The process is freely adaptable to the varying seasonal, geographic and age conditions of market cream.

The following more specific description of the invention is made with reference to the accompanying drawings in which is represented appropriate apparatus for practicing the invention.

In the drawings,

Fig. 1 is a diagrammatic representation or flow diagram of a complete system of typical apparatus employed in practicing the invention for the continuous production of butter.

Fig. 2 is a perspective view of the emulsion breaker 11 shown in Fig. 1, and Fig. 3 is a detailed sectional view in elevation of a portion thereof.

Fig. 4 is a sectional view in elevation of the serum separator 49 shown in Fig. 1.

Fig. 5 is a sectional view in elevation of the emulsion breaker intake receptacle 9 shown in Fig. 1, and Fig. 6 is a plan view thereof.

Fig. 7 is a sectional view of the pressure relief valve 79 shown in Fig. 1.

Fig. 8 is a diagrammatic representation of an arrangement for substitution of a centrifugal separator for the serum separator 49 shown in Fig. 1.

Fig. 9 is a diagrammatic representation of an arrangement for producing dehydrated butter oil by supplemental centrifugal treatment, and Fig. 10 is a diagrammatic representation of an alternative arrangement for producing dehydrated butter oil by supplemental vacuum treatment. Fig. 11 is a sectional view in elevation of the vacuum pan and condenser shown in Fig. 10. Fig. 12 is a cross-sectional view of the vacuum pan taken on the plane of the line 12—12 in Fig. 11.

Fig. 13 is a plan view, partly in section, of the composition control pump 116 shown in Fig. 1. Fig. 14 is a sectional view in elevation divided by the irregular line A—A, the upper portion being taken on the plane of the line 14U—14U and the lower portion on the plane of the line 14L—14L in Fig. 13. Fig. 15 is a partial front view in elevation of the control pump. Fig. 16 is a partial sectional view of part of the piston stroke adjustment means taken on the plane of the line 16—16 in Fig. 14. Fig. 17 is a diagrammatic representation of the operating structure of the composition control pump.

Fig. 18 is a front view in elevation, with a portion in section, of the supply reservoir 161 shown in Fig. 1.

Fig. 19 is a diagrammatic representation of an arrangement of composition mixing vats in substitution for the composition control pump 116 shown in Fig. 1.

Fig. 20 is a sectional view in elevation of the emulsifier 200 shown in Fig. 1, and Fig. 21 is a detailed view of a part thereof.

Fig. 22 is a sectional view in elevation of a cylinder and appurtenances in the chiller 217 shown in Fig. 1, taken on the plane of the line 22—22 in Fig. 26. Fig. 23 is a cross-sectional view in elevation taken on the plane of the line 23—23 in Fig. 22. Fig. 24 is a partial plan view of the agitator shown in Fig. 22. Fig. 25 is a cross-sectional view of the agitator taken on the plane of the line 25—25 in Fig. 24. Fig. 26 is a partial front view in elevation of the chiller. Fig. 27 is a sectional view in elevation of the rear end portion of a cylinder in the chiller.

Fig. 28 is a view in elevation of the chiller discharge pipe 245 and the extruding tube 250 shown in Fig. 1. Fig. 29 is a cross-sectional view of the discharge pipe taken on the plane of the line 29—29 in Fig. 28.

Fig. 30 is a diagrammatic representation of print cutting, wrapping and cartoning machines suitable for packaging prints of butter.

The process is initiated with a supply of cream normally prepared as for conventional churning and having the normal churning cream fat content of between 25 and 35 per cent. The cream may be either fresh sweet cream having low acidity or the common market product having higher acidity and known as sour cream. The delicate flavor and aroma characteristic of good butter is due largely to the reaction in the cream to lactic acid resulting from the presence in the cream of lactic bacteria. These bacteria are natural to milk, and in controlled quantity are desirable and healthful in food products for human consumption. Their lack is supplied in churning cream by the addition of a pure culture known in the butter industry as "starter." Excessive acid causes certain well known objectionable results in butter making and requires that the excess be neutralized by the established practice of adding calcium or sodium salt solution to the cream to reduce the acidity. Churning cream is thus commonly standardized to an acid content of between two-tenths and three-tenths of one per cent.

Having attained the desired acid content, the cream is pasteurized to arrest further development of the lactic bacteria and destroy any pathogenic bacteria that might be present. Pasteurization is accomplished by heating the cream to a selective coupled temperature and time period varying from 145° F. for 30 minutes to 190° F. for a few seconds. The longer time period pasteurization of the cream is done in heating vats, while the short time pasteurization is done by passing the cream through suitable continuous flow heating apparatus, both being established practices in the industry according to the arrangement of individual plant equipment.

For the purpose of description of the present invention, it is assumed that the cream, either fresh sweet cream or standardized sour cream, has been properly pasteurized before beginning the presently described process.

A suitable vat or tank, indicated in Fig. 1 of the drawings by the numeral 1, is provided for the cream supply. The vat 1 is of any suitable type, preferably incorporating means for heating its contents. Such a vat is exemplified in U. S. patent to Gilbert No. 2,196,012, issued April 2, 1940. Heating means may be otherwise provided without heating in the vat, if desired, by conducting the cream flowing from the vat, as hereinafter described, through a suitable flow type heater 2. A heater of this type is exemplified in U. S. patents to Astle, No. 2,248,933, issued July 15, 1941, and No. 2,314,966, issued March 30, 1943. A plate type heater embodying the Astle inventions is described and illustrated on pages 180 and 181 of "Dairy Engineering," written by Farrall (the present inventor), copyright 1942, and published by John Wiley & Sons, Inc., of New York.

The cream is heated to a temperature preferably between 170° F. and 190° F. This approximate temperature is preferable primarily to destroy the fat-splitting enzymes and micro-organisms which cause rancidity in butter, and to develop the anti-oxidant qualities which prevent off flavors due to oxidation of the fat. Temperatures between 170° F. and 190° F. also facilitate the subsequent operations in the process by liquefying substantially all of the fat and reducing the normal viscosity of the cream emulsion, without damaging the cream from overheating. Substantially lower temperatures cause excessive fat losses in the skim milk in the separating operation next described.

*Cream separation*

The hot cream is drawn from the vat 1 through a pipe 3 by a pump 4 of positive type having variable speed drive. One such pump is exemplified in U. S. patent to Dietzel No. 2,193,273, issued March 12, 1940, and of which a commercial embodiment is illustrated and described on page 54, Fig. 22, of "Dairy Engineering," supra. The pump 4 delivers the cream through a pipe 5 in continuous flow to a cream separator 6, preferably of centrifugal type. In the case of the use of the flow type heater 2, the cream is pumped by the pump 4 through the pipe 5 as indicated in broken lines, through the enclosed flow heater 2 and thence to the separator 6. A centrifugal cream separator, suitable for the practice of the present invention, is described and illustrated on pages 168 and 169 of "The Butter Industry," third edition, written by Hunziker, copyright 1940 and prior, and published by the author at La Grange, Illinois. The separator 6 separates the cream into a portion containing the fat in high concentration and a remaining portion of surplus serum or skim milk. The skim milk discharged by the separator from a pipe 7 is collected for processing to recover the valuable protein by-products contained therein.

The cream separator is adjusted to deliver uniformly a selective per cent of fat in the concentrated cream within an upper limit of approximately eighty per cent. When separating normal cream to deliver a fat concentration above that limit, difficulty is experienced with the available centrifugal cream separators in maintaining that degree of uniformity and efficiency of fat separation which is readily obtainable by operating them at a lesser per cent of fat concentration, and which uniform efficiency prevents excessive fat losses in the skim milk and facilitates stable control of subsequent operations in the present process. Fat concentration at this step in the process preferably is selected at between 75 and 80 per cent.

In separating cream to the high fat concentration mentioned next above, the airtight type of centrifugal separator described by Hunziker, supra, is successfully effective in continuous operation upon sweet cream. In separating sour cream to this high fat concentration, the airtight type of separator tends to clog with curd, causing failure of proper separation of the fat and requiring frequent stopping of the operation for removal of the curd. This difficulty is attributable to the effect of the excess acid in sour cream upon the colloidal proteins in the serum. The excess acid tends to coagulate the proteins and cause their precipitation to some extent as free curd in the serum. This action is proportionate to the degree of excess acidity, and is intensified by the heat of pasteurization. As a consequence, a portion of the relatively heavy precipitated curd is thrown out of the serum during the centrifuging operation and remains in the separator bowl, instead of flowing out of the bowl with the skim milk as in the case of sweet cream wherein the proteins have not been precipitated. Centrifugal separators having specially designed separating bowls are available which overcome this bowl clogging difficulty and successfully operate continuously in separating the fat from sour cream. One such, known as a valve bowl separator, embodies automatic valve means for separately discharging curd accumulations from the separating bowl while otherwise performing the usual operation of separating the fat from the serum. The valve bowl type of centrifugal separator is shown and described on page 439 in "Chemical Engineering Catalog 1943-44," copyright 1943, published by Reinhold Publishing Corporation of New York, New York.

Either type of centrifugal separator is successfully operable in practicing the present invention, accordingly as to whether sweet cream or sour cream is being processed. In the present instance, sweet cream is assumed as being processed, and the separator 6 is shown in the drawings as of the airtight type.

*Breaking emulsion and reversing phase*

The heated concentrated cream flowing continuously from the separator 6 is conducted through a pipe 8 to an enclosed receptacle 9 from which the cream is fed continuously through a pipe 10 into an emulsion breaker 11.

The heated cream enters the emulsion breaker 11 in a state of normal emulsion having the fat in dispersed phase and the serum in continuous phase. Although the volume of liquid fat is now three or four times greater than the volume of serum, the natural stability of the cream emulsion continues to maintain the fat globules in dispersed relation, each globule being surrounded by a tenacious film of serum preserving the normal state of emulsion. This is attributable to physical forces operating within the fat globules to retain their globular form, and upon the colloidal proteins contained in the serum to cover and adhere to the surfaces of the fat globules. Probably, like electric charges carried by the fat globules and having a repellent effect also tend to prevent the merging of the fat globules.

In the emulsion breaker 11, these forces are overcome and the normal emulsion is broken by subjecting the flowing stream of cream to counter forces effective to disrupt the protective films covering the fat globules and cause these globules to coalesce, or merge in part amorphously, to form a free continuous liquid in which the lesser volume of serum is at first dispersed in small droplets. The breaking of the emulsion, of fat-in-serum phase, and the reversing of this relation to a serum-in-fat phase is done substantially instantly by the emulsion breaker 11. The resulting product is a freely separable mixture of liquid fat and serum without stability in their reversed phase relation. If quiescent, the mixture will stratify immediately, the heavier serum and its contained proteins gravitating from the fat.

Preferably, the emulsion breaker 11 is an adaptation of a homogenizing machine of the pressure valve type characterized in operation by pumping a stream of liquid at high pressure through one or more closely confining valve orifices wherein extreme flow velocity is generated.

The type of homogenizing machine preferred for use in the present process is described in "Dairy Engineering," by Farrall, supra, on pages 228 to 233, and Fig. 122 in particular. Further description of homogenizing machines suitable for use in the present process is given on pages 117 to 126 of "The Theory and Practice of Ice Cream Making," third edition, written by Sommer, copyright 1938 and prior, and published by the author at Madison, Wis.

The homogenizing machine described and illustrated in Fig. 122 in "Dairy Engineering," supra, is illustrated herein as employed for the described function of the emulsion breaker 11. Fig. 2 of the drawings shows the complete machine in perspective, and Fig. 3 is a sectional view showing the cream flow passages and the arrangements of the parts performing the described function of the emulsion breaker 11. A high pressure, crank-driven triplex piston pump is suitably housed in an upper casing 12, and for which a suitable motor drive is provided and housed in a base 13. The pump and drive are of similar type to that described and illustrated by Farrall, supra, and by Sommer, supra, as common to the well known homogenizing machines, and further details of construction of the pump and its drive are deemed not necessary to the present description except as shown in Figs. 2 and 3.

The pipe 10, leading from the receptacle 9 to the emulsion breaker 11, enters an intake manifold 14 having three similar lateral branches 15 respectively communicating with three similar piston chambers provided in a head block 16. The sectional view in Fig. 3 is taken on a vertical plane through the axis of the right endward piston chamber in the block 16 as appearing in Fig. 2, and the structure shown is identical with that appurtenant to the other two piston chambers. Each branch 15 is removably coupled to a nipple 17, provided on the block 16, and having an inlet passage 18 leading to a piston chamber 19 formed in the block 16. The passage 18 is controlled by an inlet valve 20 of the poppet type operatively seated at the entrance of the passage 18 to the chamber 19. A discharge passage 21 leads from the piston chamber 19 to an upwardly opening pocket 22 formed in the upper side of the head block 16. The discharge passage 21 is controlled by a discharge valve 23 of poppet type operatively seated at the entrance of the passage 21 to the pocket 22. The three pockets 22 are interconnected by a bore 24 extending longitudinally through the block 16 and having a suitable closure at each end.

Each piston chamber 19 opens laterally through the block 16 in alignment with a cylinder 25 mounted in the pump frame 26 and abutting the block 16. The cylinders 25 and the block 16 are secured in position by bolts 27 extending through the block 16 and into the frame 26. A reciprocating pump piston 28 is operatively positioned in the cylinder 25, the three pistons being actuated by the crank mechanism housed in the casing 12.

A flanged valve retainer 29 is removably positioned in the upward opening of the right endward pocket 22, the retainer having a central bore 30 with a tapered bottom terminating in a passage 31 which communicates with the pocket 22. A cone-shaped valve 32 is seated upon the tapered bottom wall of the bore 30 and controls the passage 31. A laterally recessed compression plug 33 is freely positioned in the bore 30, and rests upon the valve 32. A casing 34 is mounted above the retainer 29 and is secured to the block 16 by bolts 35, the retainer 29 being clamped in position between the casing 34 and the block 16. A central passage 36, provided in the casing 34, communicates with the bore 30 in the retainer 29 and opens laterally at its upper end into a discharge passage 37 extending outward through a coupling nipple 38 formed on the casing 34.

A compression bar 39 is operatively supported in an upper extension of the casing 34, the lower portion of the bar 39 extending in spaced relation to the side wall of the passage 36 and endwardly contacting the valve compression plug 33. The upper portion of the bar 39 extends into a chamber 40 provided in the casing 34 and endwardly carries a disk 41. A compression spring 42 is positioned upon the disk 41 and is surmounted by another disk 43 bearing upon the inner surface of a compression adjusting cap 44 having screw-threaded engagement with the casing 34.

A pressure gauge 45 is mounted upon a closure 46 secured in the upward opening of the left endward one of the intercommunicating pockets 22 in the block 16. The upper opening of the center pocket 22 is provided with a plain closure 47 secured therein.

The heated concentrated cream is pumped from the receptacle 9 through the pipe 10, the intake manifold 14 and the passages 18 into the respective piston chambers 19. The cream is forced by the pistons 28 from the chambers 19 through the passages 21 into the intercommunicating pockets 22, thence through the entry passage 31 in the valve retainer 29 and through the valve 32 to the passage 36 and the discharge outlet passage 37. The emulsion-breaking forces herein described are generated by the pressure and velocity of flow of the concentrated cream in passing the valve 32. The latter is resiliently compressed upon its seat by the spring-pressed bar 39 and adjusted to the requisite compression by the cap 44.

The conventional function of the homogenizer, as described by Farrall and Sommer and as known to the dairy industry in the treatment of milk, cream and other dairy products, is directly contrary to its function in the present invention. Its common use is to increase the stability of the normal fat-in-serum emulsion and prevent agglomeration of the fat globules by breaking up the normal fat globules into multiple smaller globules and thoroughly dispersing the smaller globules in the continuous serum phase. The smaller globules present a greater surface area, relative to volume, for adherence by the viscous colloidal protein components of the serum, thus overcoming the natural slight buoyancy of the normal fat globules. Homogenization assures a uniform stable distribution of globular fat in the treated emulsion, as illustrated by homogenized milk in which the common phenomenon of "rising" cream is prevented.

Milk and cream as commonly homogenized vary in fat content from four per cent or less in whole milk to about 40 per cent in special purpose cream, the latter per cent being considered the maximum for successfully accomplishing the benefits sought by homogenization.

For the purposes of the present invention, it is desired not to increase the stability of the normal emulsion by subdividing and further dispersing the fat globules in the continuous serum phase, but, contrawise, to destroy the normal stability of the fat-in-serum emulsion by breaking the continuous serum phase and causing the fat globules to unite in continuous liquid form. The homogenizer, operating under the conditions of the present process upon hot cream having high fat concentration, successfully accomplishes the latter purpose in reverse of its previously utilized function.

In the present process, the heated cream entering the emulsion breaker 11 has a fat concentration of 75 to 80 per cent. In such proportion of fat to serum, the serum is so reduced in relative volume that the continuous film structure of serum between and about the dispersed fat globules is attenuated to a degree which materially lessens its resistance to rupture and substantially nullifies its normal capacity to re-cover the fat globules and preserve the continuous serum phase after such structural disturbance as is effected by the ordinary homogenization treatment of cream having substantially less fat concentration. In cream having the high fat concentration employed in the present process, the attenuated continuous serum film structure cannot preserve its continuity against the shearing forces generated by the extreme velocity of its flow through the emulsion breaker 11, and consequently the serum film breaks into dispersed droplets of serum.

The emulsion breaker 11 is adjusted for operation at a pressure only sufficient to generate such flow velocity as to disrupt the weakened continuous serum structure without materially breaking up the fat globules. Coincident with the disruption of the protective serum film, the closely associated and now uncovered fat globules immediately coalesce and merge into the continuous liquid phase carrying the droplets of serum in free unstable dispersed phase. It is probable, also, that such like electric charges as may be carried by the fat globules are discharged in the emulsion breaking operation and the fat is brought to a state of electric equilibrium whereby the fat globules may readily coalesce by contact in the absence of the repellent force operating between like charged globules.

A range of pressure somewhat lower than that ordinarily used in homogenization successfully accomplishes the thorough breaking of the emulsion, as above described, into a serum-in-fat relation. The required pressure exerted upon the cream in the emulsion breaker 11 depends upon the acidity and other conditions and characteristics of the cream. If the pressure is too low, the continuous film structure is not sufficiently broken to release the fat. If too high, the serum is broken into too fine dispersion and becomes emulsified in the fat with consequent retarding of the subsequent immediate gravitation of the serum from the fat as desired in the next step in the process.

The required degree of disruptive force for breaking the normal cream emulsion and reversing the phase relation into a serum-in-fat relation may be generated by other means, and my process is not confined to the employment of the machines specifically mentioned above. For instance, the disruptive force for reversing the normal phase relation into serum-in-fat relation may be generated by passing the stream of heated cream in a thin film between closely adjacent surfaces moving relatively at high velocity. Any suitable colloidal mill of the revolving disk type can be adapted, with necessary control of disk spacing, to accomplish the purpose of the emulsion breaker 11. However, it has not the advantage of the accurate control of flow volume and velocity possessed by the pressure pump type of emulsion breaker, nor is it as readily adaptable to the continuous enclosed flow operation of the present process. If a colloidal mill type of emulsion breaker is substituted for the above described preferred type of emulsion breaker 11, then a positive pump, such as the pump 4 before described, is required to withdraw the broken cream in controlled volume from the substituted mill type emulsion breaker and deliver it continuously for further processing as hereinafter described, the pump being connected into the discharge pipe leading from the substituted emulsion breaker. A colloidal mill, such as may be adapted to function as above described, is exemplified in U. S. patent to China, No. 1,523,632, issued January 20, 1925. A mill of this type also is shown and described on page 981 in "Chemical Engineering Catalog 1943–44," supra.

*Separating serum from fat*

The broken cream in reversed serum-in-fat phase is discharged continuously from the emulsion breaker 11 through the discharge nipple 38 and a connecting pipe 48 entering laterally into a serum separator 49. The serum separator 49 provides an enclosed chamber which is filled with the inflowing broken cream. Upon entry into the chamber, the reversed and de-stabilized liquid fat and serum phases of the broken cream emulsion immediately separate by stratification, the lighter fat fraction rising to the top of the chamber and the heavier serum fraction gravitating to the bottom of the chamber.

Fig. 4 shows a preferred construction of the serum separator 49 in which is provided a cylindrical shell 50 having a downwardly sloping bottom 51 and a removable cover 52 normally secured by swinging clamps 53, together forming the stratifying chamber. The broken cream is introduced into the chamber through a lateral inlet tube 54 mounted in the shell 50 and adapted for connection with the pipe 48 from the emulsion breaker 11. An outlet tube 55 is provided in the cover 52 for discharge of the liquid fat from the chamber, and another outlet tube 56 is provided in the bottom wall 51 for discharge of the serum from the chamber, both outlet tubes having flow connections as later described herein.

A structure for guiding the flow of the stratifying liquids within the chamber is removably mounted therein and comprises one or more hollow truncated cones, two being shown in the present instance and indicated at 57 and 58. The cones are open at top and base, and are secured to each other in vertical spaced relation by a plurality of bars 59, the lower ends of the bars resting upon the bottom wall 51 at its juncture with the shell 50 and thereby supporting and positioning the cones within the chamber. The bottom edges of the cones 57 and 58 are spaced from the shell 50 to provide flow passages therebetween. A tapered ring 60 is secured upon the upper surface of the upper cone 57, the lower edge of the ring 60 being substantially spaced from the shell 50 and the upper edge of the ring being in close contact with the upper portion of the shell. Flow openings 61 may be provided through the upper cone 57, the openings being positioned just above the juncture between the cone and the ring 60.

The inflowing hot broken and reversed phase serum-in-fat cream enters through inlet 54 into the space 62 between the ring 60, the lower portion of the upper cone 57 and the shell 50, and is directed through that space circumferentially around the chamber. From the space 62, the broken cream flows uniformly downward through the passage between the lower edge of the cone 57 and the shell 50 into the space between the two cones, and therefrom filling the entire chamber. Without appreciable turbulence in the volume of flowing liquid within the chamber, stratification of the fat and serum immediately occurs. The fat rises against the under sides of the cones 57 and 58 and is directed upwardly and inwardly toward the fat outlet 55 in the cover 52. The serum gravitates to the upper surfaces of the cones and is directed downwardly and outwardly through the openings 61 and through the passage between the lower edge of the lower cone 58 and the shell 50 into the sump formed at the bottom of the chamber and toward the serum outlet 56.

The fat is continuously discharged from the top of the serum separator 49 through the outlet 55 and a connected pipe 63 to other apparatus, hereinafter described, for further processing in accordance with the present invention. The serum is continuously discharged from the bottom of the serum separator through the outlet 56 and a connected pipe 64, the pipe 64 being interconnected at its other end with the pipe 3 between the cream supply tank 1 and the pump 4. The serum flowing through the pipe 64 is discharged into the pipe 3 wherein the serum is mixed with the cream flowing from the tank 1 to the pump 4 and is thereby returned to the cream separator 6. Thus, any fat which is entrapped in the serum returned from the serum separator 49 is recovered by the cream separator 6 in the concentrated cream, and the serum proteins are recovered with the skim milk discharged from the cream separator.

The fat loss in the present process is limited to the fractional per cent carried by the skim milk discharged from the cream separator 6 as the process retains all of the fat which is otherwise lost by conventional churning in the buttermilk and the wash water. Elimination of the use of water for washing the butter granules after conventional churning, or for diluting the cream to facilitate centrifugal separation for high fat concentration, avoids possible contamination by the water and prevents washing out of the product those volatile and soluble elements of fat and serum making for the fine flavor and aroma pleasingly characteristic of fresh butter of high quality. No washing or dilution also conserves in the skim milk the valuable serum by-products otherwise lost in the water. Thus, one of the advantages of the present invention resides in the elimination of the use of water for washing the butter granules in churning or for diluting the cream in separating the fat.

The volumetric intake rate of the positive pump in the emulsion breaker 11 is slightly greater than the normal maximum rate of discharge of concentrated cream from the cream separator 6 to the intake receptacle 9 which delivers the heated cream to the pump in the emulsion breaker. This is necessary for operating assurance that the emulsion breaker pump will take all of the concentrated cream that the cream separator will deliver. The rate of discharge of concentrated cream from the cream separator varies with the initial per cent of fat in the cream being separated, and the latter may vary by 10 per cent or more as normally received at a creamery. In order to accommodate the constant pumping rate of the emulsion breaker 11 to the variable delivery rate of the cream discharged from the cream separator 6 and to provide a full supply of concentrated cream in the intake receptacle 9, a branch pipe 65 is connected into the discharge pipe 48 leading from the emulsion breaker 11 to the serum separator 49, the branch pipe 65 having its other end leading into the intake receptacle 9 and functioning to return broken cream from the emulsion breaker discharge pipe 48 to the intake receptacle 9 in such continuous quantity only as is necessary to make up the deficiency in the inflowing stream of cream from the cream separator 6 and maintain a constant supply level in the intake receptacle 9. The small portion of broken cream so returned to the receptacle 9 and intermixed with concentrated cream from the cream separator 6 appears to increase the efficiency of the emulsion breaker 11 in de-stabilizing the broken cream.

Figs. 5 and 6 show a preferred construction of the intake receptacle 9 and its several connections as above mentioned. A cylindrical shell 66 having a laterally sloping bottom 67 is provided at its lower bottom edge with an outlet 68 adapted for connection with the pipe 10 leading into the emulsion breaker 11. A top closure 69 has a flanged opening 70 upon which a cover 71 is adjustably mounted. The cover 71 is provided with an opening 72 which may be adjusted in position by rotation of the cover 71 to accommodate the entry into the receptacle of the open discharge end of the pipe 8 carrying the hot concentrated cream flowing from the cream separator 6 and from which the concentrated cream flows continuously into the receptacle.

A lateral inlet tube 73 is fixed in the side wall of the shell 66, the outer end of the tube 73 being adapted for connection with the branch pipe 65 which returns a portion of the broken cream discharged from the emulsion breaker 11 as described above. A removable sleeve bracket 74 is mounted on the extended inner end of the tube 73 and held in position by a removable pin 75. A float 76 is fixed upon one end of a supporting rod 77, the other end portion of the rod 77 being bent at a right angle and extending freely through lateral openings in the bracket 74, thus serving as a pivot for vertical swinging movement of the float 76 and rod 77. The tube 73 is laterally slotted to receive the pivot portion of the rod 77 when the bracket 74 is assembled on the tube 73. A fly valve 78 is fixed upon the pivot portion of the rod 77 in position for entry into the tube 73 when the bracket is assembled on the tube. The valve 78 is operable by the float 76 through the support rod 77 to control or throttle the inflowing stream of broken cream returning through the branch pipe 65 from the emulsion breaker 11. Thus, the combined quantity in the receptacle 9 of the inflowing concentrated cream from the cream separator 6 and the inflowing broken cream from the emulsion breaker 11 is maintained at a predetermined level and balanced against the rate of outflow of the mixture to the emulsion breaker 11.

As a further provision for control of the return flow of broken cream from the discharge side of the emulsion breaker 11 to the intake receptacle 9, a pressure relief valve 79 is mounted in the discharge pipe 48 from the emulsion breaker 11 to the serum separator 49 and positioned between the serum separator and the junction of the return branch pipe 65 with the discharge pipe 48. Fig. 7 shows a preferred construction of the relief valve 79 adapted to be mounted within a conventional coupling between sections of the discharge pipe 48. Referring to Fig. 7, a cup-shaped member 80 is positioned in one of the coupled sections of the pipe 48 and extends in the direction of flow toward the serum separator 49. The member 80 is provided with an integral radial flange extending between the adjacent ends of the two sections of the pipe 48 and is clamped in position by drawing up the coupling nut 81. The member 80 is provided with a valve orifice 82 opening through its inner end and in which is operatively seated a poppet valve 83 having a fixed stem 84 slidably extending through a guide bearing provided in a spider 85 positioned across and abutting the member 80. A coiled spring 86 is positioned about the outer end portion of the stem 84, the spring bearing at one end against the spider 85 and retained under compression at its other end by abutment with a retainer 87 removably mounted upon the end of the stem 84. Thus, a predetermined pressure in the rearward section of the pipe 48 forces the poppet valve 83 from its seat in the orifice 82 for flow of the broken cream therethrough.

The pressure relief valve 79 functions to divert all of the broken cream discharged by the emulsion breaker 11 through the return branch pipe 65 until the receptacle 9 is filled and until the float-controlled fly valve 78 operates to throttle the flow from the branch pipe 65, whereupon the relief valve 79 automatically opens to direct the flow of broken cream into the serum separator except for that small compensating portion required to maintain the supply level in the receptacle 9.

Another pressure relief valve 88, similar in construction and operation to that above described and shown in Fig. 7, is mounted in the pipe 64 leading from the serum discharge outlet 56 of the serum separator 49. The pressure relief valve 88, in the serum discharge pipe 64, functions to prevent discharge of the serum from the serum separator 49 until the latter is filled with the stratified broken cream and until the fat in the upper portion of the serum separator is being discharged through the fat outlet 55 and the connected pipe 63 by the pressure of the inflowing broken cream from the emulsion breaker 11. Thereupon, the relief valve 88 automatically opens and permits the continuous discharge of the serum from the bottom of the serum separator 49 through pipe 64 to the intake pipe 3 of the cream supply pump 4.

The serum separator 49 may be varied in design, such as by providing more or less holding capacity in the chamber to vary the time allowed for stratification, and by providing greater or less cross-sectional area in the chamber with constant capacity to vary the depth of travel of the gravitating serum. These factors of design, together with the relation of the rate of flow of fat from the serum separator to the rate of flow of broken cream into the serum separator, enable accurate predetermination and control of the proportionate amount of serum being carried by the fat discharged from the serum separator. Ninety-eight per cent fat and two per cent serum is a convenient proportion for the subsequent addition of the ingredients required to make a normal butter composition.

The function of the serum separator 49, in separating the dispersed serum from the continuous liquid fat in the broken and reversed phase cream after treatment by the emulsion breaker, also may be accomplished by centrifugal separation. As previously mentioned herein, the available centrifugal separators do not satisfactorily separate churning cream, in its normal state of unbroken fat-in-serum emulsion, to produce a concentration of the fat in excess of about 80 per cent. However, having so produced a concentrated normal cream with somewhat less than 80 per cent fat, and having broken the concentrated cream into a de-stabilized reversed phase serum-in-fat mixture, as previously described herein, then the available centrifugal separators may be successfully employed to separate further the broken mixture of fat and serum to produce a concentration of the fat in excess of 98 per cent.

A centrifugal separator of either the airtight type or the valve bowl type previously described herein may be substituted for the serum separator 49. A sweet cream operation being assumed in the present instance, the airtight type of separator is preferable. Fig. 8 of the drawings illustrates the arrangement of a centrifugal separator of the airtight type and its flow connections in such substitution. Referring to Fig. 8, the separator 89 receives the broken reversed serum-in-fat mixture flowing from the emulsion breaker 11 through the pipe 48 and pressure relief valve 79. The separated liquid fat fraction is discharged from the separator 89 through the pipe 63a for further treatment in accord with the present invention as hereinafter described. The separated serum fraction is discharged from the separator 89 and returned through the pipe 64a to the pipe 3 wherein the returned serum is intermixed with the initial cream supply as previously described herein. In this instance, the previously described pressure relief valve 88 is omitted from the pipe 64a.

While the function of separating the dispersed serum from the continuous fat phase in the broken cream after treatment by the emulsion breaker 11 may be accomplished by centrifugal separation, the first described serum separator 49 has the preferable advantages of simplicity of operation and low cost of construction.

*Dehydrated butter oil*

After obtaining the high fat fraction containing approximately 98 per cent of liquid fat and 2 per cent of serum or moisture in de-stabilized relation, the continuity of the present process for making butter may be interrupted and the high fat fraction may be treated to remove substantially all of the remaining serum or moisture and produce dehydrated butter oil. The latter product has distinct advantages for the storage and shipment of butter fat. Properly packaged in sealed containers, it enables the accumulation, storage and shipment of butter fat at the centers of milk-producing areas, without the usual hazards of deterioration and the necessity for refrigeration involved in the storage and shipment of milk, cream and butter, and with substantial savings in transportation costs. Thus dehydrated butter oil may be produced, properly packaged and shipped to remote facilities at centers of consumption areas for further processing in accordance with the hereinafter described further steps of the present invention in the manufacture of butter. The dehydrated product may be otherwise utilized to advantage in the making of ice cream, reconstructed milk and cream, butter spreads and other dairy food products, especially in areas where a safe fresh milk supply is not available.

Substantial dehydration of the high fat fraction having approximately 2 per cent of serum or moisture may be accomplished by centrifugal separation or by vacuum treatment. The remaining moisture thus may be reduced to less than .05 of one per cent, which is satisfactory for the purposes and uses above mentioned.

Standard centrifugal separators which are adapted for such exhaustive separation of moisture are available. The previously described airtight type of separator is preferable for use in this instance, the separating bowl being provided with discs which are of standard manufacture and adapted for the exhaustive separating treatment of oil and moisture mixtures having not to exceed approximately 2 per cent of moisture. Fig. 9 shows an arrangement for the employment of such a centrifugal separator in the production of dehydrated butter oil. Referring to Fig. 9, the hot de-stabilized high fat fraction, having approximately 98 per cent liquid fat and 2 per cent serum or moisture, flows from the serum separator 49 through the pipe 63 as previously described. The pipe 63 is connected to and delivers the fat fraction to a centrifugal dehydrating separator 90. The separated serum or moisture is discharged from the separator 90 through a pipe 91, and may be collected for recovery of such protein by-products as it contains. The dehydrated butter oil flows from the separator 90 through a pipe 92 from which the oil is discharged preferably into sterile containers having sealable closures and suitable for storage or shipment of the oil.

An alternative arrangement for producing dehydrated butter oil by vacuum treatment is shown in Figs. 10, 11 and 12. Referring to Fig. 10, the high fat fraction flowing from the serum separator 49 is conducted through the pipe 63 into a vacuum pan 93 wherein a vacuum is maintained of approximately 27 inches of mercury. At that vacuum, the boiling temperature of the moisture in the high fat fraction is lowered to about 115° F. The fat fraction enters the vacuum pan at a temperature of about 165° F. There being only about 2 per cent of moisture in the fat fraction, the 50 degrees of super heat in the fat fraction over the boiling temperature of the moisture at the vacuum mentioned is sufficient to evaporate substantially all of the moisture contained in the fat fraction entering the vacuum pan without the application of additional heat. The evaporated moisture is withdrawn from the vacuum pan 93 through a pipe 94 and into a water jet condenser 95. The cooling water is supplied to the condenser jet by a pipe 96. The condensate and spray water are withdrawn from the condenser 95 through a pipe 97 leading to a vacuum pump 98. The vacuum pump 98 is effective to withdraw water, vapor and air from the condenser and the vacuum pan, and maintain in the pan the selected degree of vacuum mentioned above. A pump of the type required for this service is shown and described as an air compressor and vacuum pump on page 854 in "Chemical Engineering Catalog 1943–44," supra.

The boiling temperature of the liquid fat in the above mentioned vacuum is well above 165° F., so that the fat is not evaporated in the vacuum pan. The liquid fat is collected in the vacuum pan 93 substantially free of moisture, and is withdrawn therefrom through a pipe 99 leading to an oil pump 100. The oil pump 100 is similar to the cream supply pump 4 previously described. The oil pump discharge pipe 101 is adapted to deliver the dehydrated butter oil into suitable containers as previously described.

Referring to Figs. 11 and 12, the vacuum pan 93 and water jet condenser 95 are shown in sectional views which exemplify the construction of these well known devices. The vacuum pan 93 comprises a cylindrical shell 102 having a removable top closure 103 and an inclined bottom wall 104, together forming an evaporating chamber 105. The vapor outlet pipe 94 is connected in the upper end of the shell 103 and leads to the condenser 95. An oil outlet tube 106 is mounted in the bottom wall 104 and is adapted for connection with the pipe 99 leading to the oil pump 100. An inlet tube 107 is provided in the upper portion of the shell 102, the outer end of the tube 107 being adapted for connection with the pipe 63 through which the high fat fraction is delivered from the serum separator 49 to the vacuum pan 93. A spray pipe 108 is provided within the chamber 105, the spray pipe having one end closed and the other end connected to the inner end of the inlet tube 107. Multiple lateral spray openings 109 are provided in the spray pipe 108 from which the hot liquid fat fraction is sprayed into the evaporating chamber 105 and the moisture evaporated therefrom. The water jet condenser 95 comprises a cylindrical casing 110 having a tapered bottom wall 111 and a removable top closure 112, together forming a condensing chamber 113. The pipe 97, leading to the vacuum pump 98, is connected into the bottom wall 111. The top closure 112 is provided with a water inlet tube 114 having a water jet head 115 mounted on the end within the chamber 113. The outer end of the water inlet tube 114 is adapted for connection with the cooling water supply pipe 96. The vapor outlet pipe 94, leading from the vacuum pan, is connected laterally into the casing 110 for discharge of the vapor into the condensing chamber 113. A spray of cold water flowing from the jet head 115 intermingles with and condenses the hot vapor entering the condensing chamber 113. The water, condensate and any entrained air or vapor are withdrawn from the chamber 113 through the discharge pipe 97 by the vacuum pump 98, thus maintaining the desired vacuum in the vacuum pan 93.

Centrifugal separation and vacuum treatment for dehydrating butter oil have their respective advantages. Centrifugal separation preserves in high degree those volatile elements previously referred to as contributing to the desirable flavor and aroma of butter. Centrifugal separation removes the serum and its contained curd, but does not remove the entrained air which may be in the fat fraction and may cause some oxidation of the dehydrated butter oil during storage, nor does it remove objectionable volatile odors and flavors such as result from the consumption by grazing cows of certain kinds of vegetation sometimes growing in feed pastures. Vacuum treatment, as above described, removes from the fat fraction the entrained air and the objectionable volatile odors and flavors resulting from cow feed, or sometimes resulting from excessively sour cream, but with the sacrifice of removing also some part of the low vaporizing glycerides and volatile elements contributing desirable flavor and aroma in high grade butter. Also, the vacuum treatment evaporates the moisture from the serum contained in the fat fraction without removing the curd contained in the serum.

A choice between centrifugal separation and vacuum treatment for dehydration is determined by the characteristics of the cream available to the producer of butter oil. It may be desirable in some cases to employ the advantages of both methods by first subjecting the high fat fraction to a deodorizing vacuum treatment and then accomplishing final dehydration by centrifugal separation. In such a combination dehydrating treatment, the vacuum employed is substantially lower than required for complete dehydration. About 25 inches of mercury is sufficient for substantial removal of entrained air and the objectionable volatile odors and flavors without extreme vaporization and removal of the volatile elements desired to be retained, but leaving in the fat fraction an appreciable amount of unevaporated serum. The final centrifugal separating treatment removes from the fat fraction the remaining serum moisture and curd to the degree described as satisfactory for dehydrated butter oil.

A preferred arrangement for effecting this combination dehydrating treatment employs the vacuum pan 93 with its connections and accessories as previously described herein and shown in Fig. 10. The oil pump discharge pipe 101 shown in Fig. 10 is connected to the centrifugal dehydrating separator 90, previously described and shown in Fig. 9, the oil pump discharge pipe 101 taking the place of the fat fraction delivery pipe 63 shown in Fig. 9. By this arrangement the high fat fraction flowing from the serum separator 49 is conducted through the pipe 63 (Fig. 10) into the vacuum pan 93. After treatment in the latter, as described, the treated fat fraction is withdrawn through the pipe 99 by the oil pump 100 and delivered through the pump discharge pipe 101 to the centrifugal dehydrating separator 90 (Fig. 9). The separator 90 functions to remove the serum and deliver dehydrated butter oil as previously described herein.

In resuming the present butter-making process with the dehydrated butter oil, the latter is removed from its storage containers and placed in a heating vat (not shown in the drawings) similar to the cream supply vat 1 previously described herein. The butter oil is heated to a temperature sufficient to completely liquefy all of the fat, preferably above 160° F. The hot oil is withdrawn from the vat through an outlet pipe having a discharge connection equivalent to the discharge connection hereinafter described for the pipe 63 (Fig. 1) conducting the high fat fraction from the serum separator 49, the hot butter oil being further processed as hereinafter described for the fat fraction flowing from the serum separator.

Before leaving the subject of vacuum treatment as employed in the present invention, it is here pointed out that under the above mentioned conditions which cause mal odors in cream and in the product made therefrom, the vacuum pan may be employed to deodorize the high fat fraction flowing from the serum separator 49 when proceeding continuously with the present butter-making process without the interim production of dehydrated butter oil. In such case the vacuum pan and its accessories are installed and connected for operation as shown in Fig. 10 and as described above for the production of dehydrated butter oil, except that the oil pump 100 is omitted and the pipe 99 conducting the liquid fat from the vacuum pan is connected to the composition control pump next hereinafter described. Such installation and connections are shown diagrammatically in Fig. 1 wherein the vacuum pan 93 receives the high fat fraction from the serum separator 49 through the pipe 63 and delivers the vacuum-treated high fat fraction through the discharge pipe 99 for further processing as hereinafter described for the fat fraction flowing directly from the serum separator 49. The vapor discharge pipe 94 carries the vapor to the condenser and vacuum pump as previously described and shown in Fig. 10 but omitted from Fig. 1.

In order to accomplish the deodorizing treatment here contemplated, it is not necessary to employ as high vacuum as for complete evaporation of the moisture content as described above for producing dehydrated butter oil. A vacuum of about 25 inches of mercury is sufficient to flash out the mal odorous vapors and entrained air with the evaporation of a portion only of the moisture or serum contained in the high fat fraction.

*Butter composition*

The high fat fraction flowing from the serum separator 49 retains heat at a temperature sufficiently high to maintain the fat in fluid condition. The stream of liquid fat passes through pipe 63 (Fig. 1) to a composition control pump 116 wherein the ingredients required to make up the desired composition of the finished butter are introduced into the fat. In preferable form, the pump 116 comprises the construction shown in Figs. 13 to 16, inclusive, the essential working arrangement of which is further shown diagrammatically in Fig. 17. Referring to Figs. 13 to 16, inclusive, the pump is provided with three pumping cylinders 117, 118 and 119 which are removably secured to a frame 120. The two cylinders 117 and 118 are of like bore and capacity while the third cylinder 119 is of smaller bore and capacity. Each of the two cylinders 117 and 118 is provided with a piston 121 having one end operatively positioned within the cylinder and having its outer end secured to a crosshead 122 slidably mounted in a suitable bearing provided in the frame 120. A pair of like connecting rods 123 are pivotally connected respectively to the crossheads 122, the opposite ends of the connecting rods being operatively mounted upon offset eccentric journals 124 provided respectively therefor on a crank shaft 125 having suitable end bearings in the frame 120. The crank shaft 125 is rotatable by means of a gear 126 fixed upon the crank shaft and having driven engagement with a pinion gear 127 carried by a pinion shaft 128 having suitable bearings in the frame 120 and having a drive pulley 129 mounted upon its outer end.

The third and smaller cylinder 119 is similarly provided with a piston 130, of less diameter than the other pistons, having one end operatively positioned in the cylinder and having its outer end secured to a crosshead 131 slidably mounted in a suitable bearing provided in the frame 120. Adjustable means for varying the length of stroke of the smaller piston 130 comprises a yoke 132 pivotally connected at one end to the crosshead 131 and having its opposite divided end pivotally connected to a block 133 slidably supported in a slot 134 provided in a rocker arm 135. The divided upper end of the rocker arm 135 is provided with a pair of stub shafts 136 and 137 having suitable bearings in the frame 120. A short connecting rod 138 is pivotally connected at 139 to one side of the rocker arm 135, its opposite end being operatively mounted upon a third eccentric journal 140 provided therefor on the crank shaft 125.

The position of the sliding block 133 in the rocker arm 135 is adjustably determined by a screw shaft 141 positioned in the slot 134 with its ends rotatably supported in the end portions of the rocker arm. The screw shaft 141 extends through a screw-threaded bore in the sliding block 133. The extended upper end of the screw shaft 141 carries a bevel gear 142 positioned between the divided upper end portions of the rocker arm and having engagement with another bevel gear 143 mounted on a small shaft 144 operatively supported in an axial bore through the stub shaft 136. A sleeve 145, positioned outwardly of the frame 120, is secured to an outward extension of the stub shaft 136. The outer end portion of the sleeve 145 is screw-threaded and operatively supports thereon an internally threaded cap 146. Within the cap 146 and secured thereto is a tube 147 extending slidably over the outer end portion of the small shaft 144, the latter having a slot 148. A cross pin 149 extends freely through the slot 148 and is endwardly secured in the tube 147. Graduated markings, as indicated at 150, are provided on the outer surface of the sleeve 145, and over which the overlying end of the screw-threaded cap 146 passes upon manually turning the latter, the markings serving to indicate the position of the cap.

It will here be seen that the operating position of the sliding block 133 in the rocker arm 135 may be accurately determined and adjusted by manually turning the adjusting cap 146 upon the sleeve 145, whereby the small shaft 144, the two engaging bevel gears 143 and 142, and the screw shaft 141 engaging the block 133 are rotated to shift the position of the sliding block 133 within the slot 134 in the rocker arm 135. By this means, the length of stroke of the piston 130 is accurately determined, and the operating capacity of the cylinder 119 is accurately adjustable in variable relation to the combined operating capacity of the other two cylinders 117 and 118, for the purpose of closely regulating the proportion of added ingredients to fat in the make-up of the butter composition as hereinafter described.

Each of the three cylinders is provided with an intake connection 151 having a passage 152 entering the cylinder and controlled by a valve 153, and is also provided with a discharge connection 154 having a passage 155 entering the cylinder and controlled by a valve 156. A common discharge manifold 157 has three branches respectively attached to the three cylinder discharge connections 154, and receives the discharge in operation from all three cylinders. An intake manifold 158 has two branches respectively attached to the two cylinder intake connections 151 leading into the two larger cylinders 117 and 118, the intake manifold 158 being connected with the high fat fraction delivery pipe 63 leading from the serum separator 49. A pipe fitting 159 is attached to the intake connection 151 leading into the third or smaller cylinder 119, the fitting 159 being connected to a pipe 160 leading from a supply reservoir 161 in which is maintained a supply of liquid ingredients to be added to the high fat fraction in the make-up of the butter composition.

The supply reservoir 161 preferably comprises a cylindrical shell 162 (see Fig. 18) having a sloping bottom 163 and provided at its lower bottom edge with an outlet connection 164 adapted for connection with the pipe 160 leading to the smaller cylinder 119 of the composition control pump 116. A removable cover 165 provides a top closure. A lateral inlet tube 166 is fixed in the side wall of the shell 162. Mounted upon the inner end of the inlet tube 162 is a float-controlled valve structure 167 of similar construction and function to that previously described as a part of the intake receptacle 9 for the emulsion breaker 11 and shown in Fig. 5, parts 74 to 78 inclusive. A quantity of the liquid ingredients is prepared and heated in a vat 168 (Fig. 1) preferably similar to the cream supply vat 1 previously described. A pipe 169 connects the vat outlet to a pump 170 of centrifugal type such as described on pages 50 and 51 and illustrated in Fig. 21 on page 54 of "Dairy Engineering," supra. A discharge pipe 171 leads from the pump 170 and is connected to the outer end of the inlet tube 166 entering the supply reservoir 161.

The composition control pump 116 is operated by a variable speed motor drive mounted within the lower portion of the pump frame 120. Referring to Fig. 14, an electric motor 172 is secured to a swinging plate 173 pivotally supported upon a bar 174, the latter being endwardly secured upon the frame 120. A bracket 175 is fixed upon the plate 173, the bracket having spaced walls in which like registering slots 176 are provided. A pin 177 is operatively positioned within the slots 176. An eye-bolt 178 is mounted upon the pin 176 between the spaced walls of the bracket. The screw-threaded portion of the eye-bolt extends within an internally threaded flanged sleeve 179 rotatably mounted in a bearing 180 provided in the frame 120. A turning knob 181 is secured upon the outer end of the sleeve 179. Turning the knob 181 moves the eye-bolt 178 inwardly or outwardly of the sleeve 179 and thereby effects the swinging of the plate 173 and the motor 172 about the pivotal support 174. The motor 172 is provided with a variable pitch V belt drive pulley 182 of conventional and well known design upon which is operatively positioned an endless V belt 183 running also upon the pulley 129 previously described. The swinging of the motor 172 varies the distance between centers of the pulleys 182 and 129 and thereby automatically varies the pitch diameter of the pulley 182 and consequently the speed of the pulley 129.

The variable speed drive for the composition control pump 116 is adjusted so that the combined intake flow rate of the two larger cylinders 117 and 118 receiving the heated liquid fat is of such lesser quantity than the constant discharge flow rate of the emulsion breaker 11 that the confined excess flow from the latter will cause the previously described return flow of broken cream through pipe 65 to the emulsion breaker intake receptacle 9, and also cause the previously described discharge of separated serum from the serum separator 49 through pipe 64 to the intake of the cream separator supply pump 4. The adjusted difference in flow rates between the emulsion breaker 11 discharge and the composition control pump 116 intake maintains a constant flow of liquid fat supplying the two fat receiving cylinders 117 and 118 of the composition control pump 116, and coincidently forces return flow in the two return pipes 65 and 64 in such volume that the separation of the serum from the fat in the serum separator 49 is in constant balance. Any change in speed of the cream separator supply pump 4, with consequent change in the rate of flow of cream from the separator 6 to the emulsion breaker intake receptacle 9 and inverse change in rate of return flow of broken cream through pipe 65 to the receptacle 9, is compensated for by adjustment of the speed of the composition control pump 116 to maintain the balanced flow of fat from the serum separator 49 to the composition control pump 116.

The variable stroke piston displacement of the third cylinder 119 is adjusted to deliver into the common discharge manifold 157 with the fat just that quantity of prepared composition solution from the reservoir 161 which, when mixed with the fat, will produce the desired composition of the finished butter in uniform percentages of fat, serum solids, salt and moisture.

The composition solution, preferably prepared and heated in the vat 168, is made up of those ingredients normally added to butter as produced by the conventional process. A marked advantage of the continuous process of the present invention is that exact percentage proportions of the fat and of each of the other butter ingredients are predetermined and uniformly maintained in production. The basic solution is salt dissolved in pure water. Butter color may be added to the solution, but preferably should be added to the cream in the supply vat 1 for better distribution of the color. Flavor and aroma of the butter may be intensified by adding to the solution a quantity of pure "starter," commonly used in ripening cream before conventional churning. The serum solids (proteins) content of the butter is determined in the desired proportion by adding the required amount of pasteurized skim milk to the composition solution.

The composition make-up may be employed for the adjunctive purpose of producing edible "spreads" having a butter fat base. Thus, hydrogenated vegetable oils may be introduced to raise the melting temperature above that normal to butter for consumption in hot climates. Serum solids, in quantity abnormal to butter, may be added for the same purpose. Honey, maple sugar, or other edible flavors may be introduced in producing flavored "spreads." Such compositions are carried through the subsequent steps of the present process similarly to the treatment herein described for producing butter.

As an alternative procedure to that of introducing the added composition ingredients into the stream of liquid fat during passage through the composition control pump 116 as above described, the composition ingredients may be added to the liquid fat in substantial quantities of each in suitable mixing or standardizing vats. Fig. 19 shows an arrangement whereby this alternative procedure may be followed in conformity with the continuous process of the present invention. Referring to Fig. 19, three standardizing vats 184, 185 and 186 are provided, the vats preferably being similar to the cream supply vat 1 previously described. The pipe 63, which conducts the liquid fat fraction from the serum separator 49, is connected with three branch inlet pipes 187, 188 and 189 leading respectively into the three vats 184, 185 and 186. Each of the branch inlet pipes is provided with a valve 190, preferably of the manually operated rotary plug type. Three branch discharge pipes 191, 192 and 193 are connected respectively to the outlets from the vats 184, 185 and 186, the branch discharge pipes being also connected to a common discharge pipe 194. Each of the branch discharge pipes is provided with a valve 195 of the manually operated rotary plug type.

In the present alternative arrangement, wherein the composition ingredients are added to the liquid fat in the standardizing vats and not in the composition control pump as previously described, the provision in the composition control pump of means for continuously introducing the composition ingredients into the stream of liquid fat passing through the pump is not necessary. In the present arrangement, as shown in Fig. 19, a substitute composition pump 196 is preferably of positive rotary type similar to the cream supply pump 4 previously described. Also, the supply reservoir 161, the centrifugal pump 170, the vat 168 and their connections as shown in Fig. 1 are omitted in the alternative arrangement shown in Fig. 19. In the present instance (Fig. 19), the common discharge pipe 194 leading from the standardizing vats is connected to the inlet of the composition pump 196. A pipe 197 is connected to the discharge outlet of the pump 196 and conducts the standardized butter composition mixture to the next step in the process of the present invention as hereinafter described.

The standardizing vats 184, 185 and 186 are filled and emptied in rotation to effect over-all continuous operation. The valve 190 in the branch inlet pipe 187 is first opened to direct the liquid fat fraction flowing from the serum separator 49 through the pipe 63 into the vat 184. When a predetermined quantity of liquid fat has been delivered into vat 184, the valve in the inlet pipe 187 is closed and the valve in the next inlet pipe 188 is opened to direct the flow of liquid fat into the vat 185. While vat 185 is being filled, the amount of composition ingredients in solution required to make the desired butter composition is added to the liquid fat in vat 184 and thoroughly mixed therein. When the second vat 185 is filled, its inlet valve is closed and the valve in the inlet pipe 189 is opened to direct the flow of liquid fat into the third vat 186. At this time also, the outlet valve 195 in the branch discharge pipe 191 is opened to discharge the butter composition mixture from the first vat 184 through the pipe 194 to the composition pump 196. While the third vat 186 is being filled, the required amount of composition ingredients is added to the second vat 185 and intermixed with the fat therein. As the third vat 186 is filled, the first vat 184 is emptied, whereupon the outlet valve in the branch discharge pipe 191 from the first vat 184 is closed, the outlet valve in the branch discharge pipe 192 from the second vat 185 is opened, the inlet valve in the branch inlet pipe 189 to the third vat 186 is closed, and the inlet valve in the branch inlet pipe 187 to the first vat 184 is opened.

The several inlet and outlet valves for the three standardizing vats are thus operated progressively through the cycle of three periods for filling, mixing and emptying of each vat, and continued in rotation. By this procedure the continuous flow of liquid fat into the standardizing vats and the continuous flow of the butter composition mixture from the vats is maintained in continuity with the other continuous steps in the process of the present invention.

When employing the alternative arrangement shown in Fig. 19, the previously described automatic control of the relative rates of flow of liquid fat and serum from the serum separator 49, resulting from the difference in effective pumping capacity between the emulsion breaker 11 and the composition control pump 116, becomes ineffective because of the free discharge of the liquid fat from the serum separator 49 into the standardizing vats 184, 185 and 186. In such case, the pressure relief valve 88 is omitted from the serum discharge pipe 64, and the relative flow rates of liquid fat and serum from the serum separator 49 are maintained by means of a positive pump 198 connected into the serum discharge pipe 64 as shown in Fig. 1. The pump 198 preferably is similar to the cream supply pump 4 previously described. The variable speed drive, with which the pump 198 is provided, enables adjustment of its pumping rate to withdraw serum from the serum separator 49 at such rate as will maintain the desired balanced discharge flow of liquid fat from the serum separator to the standardizing vats. Similar installation of the serum discharge pump 198 is required also when producing dehydrated butter oil as previously described, both when using the centrifugal dehydrating separator 90 and when using the vacuum pan 93. The serum discharge pump 198 is likewise required when employing the vacuum pan 93 to deodorize the high fat fraction flowing from the serum separator 49 as previously described.

Modification

Practice of the hereinbefore described portion of the process of the present invention produces a liquid composition mixture of the fat and other ingredients in the proportions desired in the finished butter. The remaining portion of the process as hereinafter described relates to the emulsification, re-stabilization, chilling and working of the mixture into finished butter. Before proceeding with the description of the latter portion of the process, a modification of the preceding portion is here pointed out and described.

In the practice of that portion of the process hereinbefore described, normal churning cream is heated and separated to produce an intermediate concentration of the cream having between 75 and 80 per cent of fat, the intermediate concentrated cream emulsion is broken and reversed in phase to produce a de-stabilized mixture of fat and serum, the de-stabilized mixture is again separated to produce a high fat fraction containing approximately 98 per cent of fat, and other ingredients are added to produce a liquid mixture having the desired composition of butter. The foregoing practice is preferred for economy, uniformity and ease of control of results. However, the foregoing portion of the process may be modified and the end result of producing a liquid mixture of the fat and other ingredients having the desired composition of butter may be accomplished by one initial separation of the heated churning cream to produce a final concentration of the cream having about 90 per cent of fat, then breaking and reversing the phase of the concentrated cream emulsion, and finally adding the other ingredients in required proportion for the desired butter composition.

As before stated herein, centrifugal separation of cream, in its normal state of emulsion and without dilution, involves difficulties in operation and excessive loss of fat in the skim milk when the fat concentration is carried above 80 per cent. However, centrifugal separators are available, as for example the valve bowl type previously described herein, which may be adjusted to separate normal undiluted churning cream and produce a concentration of the cream with fairly uniform fat content of about 90 per cent. In thus separating for this per cent of fat in the concentrated cream, an appreciable amount of fat remains in the skim milk and in the separated curd, which may be later recovered by reseparation to avoid excessive loss of fat.

In practicing this modification of the process, the centrifugal cream separator 6, in this instance preferably of the valve bowl type previously described herein, is adjusted to deliver concentrated cream having approximately 90 per cent fat content. The concentrated cream is delivered to and treated by the emulsion breaker 11 in the same manner and with the same effect as hereinbefore described. In this modification, the serum separator 49, the high fat fraction discharge pipe 63, and the serum discharge return pipe 64 are eliminated. The discharge pipe 48 leading from the emulsion breaker 11 is extended into direct connection with the intake manifold 158 of the composition control pump 116. Alternatively, the emulsion breaker discharge pipe 48 may be extended into direct connection with the branch inlet pipes 187, 188 and 189 leading into the standardizing vats 184, 185 and 186. The composition ingredients are added to the broken and reversed phase mixture of fat and serum flowing directly from the emulsion breaker 11 to the composition control pump 116, or to the standardizing vats 184, 185 and 186, in the same manner and with the same effect as hereinbefore described.

Recovery of the fat remaining in the skim milk and in the curd may be made at the conclusion of the operating run of the butter-making process. The collected skim milk and curd are intermixed and reheated to fat-liquefying temperature in the cream supply vat 1. The centrifugal separator 6 is readjusted to separate the fat at a relatively low per cent of concentration at which clean separation is attained. The separator discharge pipe 8 is disconnected from the receptacle 9 and arranged to discharge into a suitable portable container. The supply pump 4 is then put in operation and the skim milk is again run through the separator 6, the recovered fat being held for the next run of the butter-making process and intermixed with the cream supply provided therefor.

Emulsification

The composition mixture of liquid fat, serum and added ingredients is continuously discharged under pressure from the composition control pump 116 through a pipe 199 leading to an emulsifier 200. The emulsifier 200 is shown in preferred form in Figs. 20 and 21, and comprises a cylindrical casing 201 having a removable closure 202 at its upper end and having a lateral inlet branch 203 adapted for connection with the discharge pipe 199 from the composition control pump 116. A removable plug 204 is positioned within the inlet branch 203 and is provided with a spacing stem 205 endwardly abutting the opposite wall of the casing 201. Spiral grooves 206 are formed in the perimeter of the plug 204 to provide flow passages for the composition mixture entering the casing 201.

The lower end of the casing 201 is adapted for connection with a discharge pipe 207 by means of a coupling nut 208. A cup-shaped member 209 is positioned at the lower end of the casing 201 and extends into the discharge pipe 207. The member 209 is provided with an integral radial flange extending between the adjacent ends of the casing 201 and of the discharge pipe 207, and is clamped in position by the coupling nut 208. The member 209 is provided with a valve orifice 210 opening through its end and in which is operatively seated a conical valve 211 having a fixed stem 212 slidably extending through a guide bearing provided in a spider 213 positioned across and abutting the member 209. A coiled spring 214 is positioned about the inner end portion of the stem 212, the spring bearing at one end against the spider 213 and retained under compression at its other end by abutment with a retainer 215 removably mounted upon the end of the stem 212. The valve 211 is preferably provided with annular grooves 216 in aid of the valve's emulsifying function.

Operating under the discharge pressure of the composition control pump 116, the restricted area and spiral direction of the grooves 206 in the plug 204 cause increased flow velocity and a swirling action in the liquid mixture passing therethrough which effect thorough intermixing of the liquid components. Continued flow of the liquid mixture through the valve orifice 210 at high velocity against the spring-actuated pressure of the grooved valve 211 effects a finely divided dispersal of the incorporated serum and the added composition ingredients within the continuous liquid fat. Thus the reversed phase serum-in-fat emulsion characteristic of butter is established, but without as yet being stabilized. As alternative practice, the function of the emulsifier 200 may be accomplished by agitation within the chiller hereinafter described, but the quality of the butter texture is controlled more readily by emulsification preliminary to chilling.

*Cooling and working*

The liquid serum-in-fat emulsion is conducted from the emulsifier 200 through the discharge pipe 207 to a chiller 217. The chiller 217 is essentially an adaptation of the cooling and agitating means used in apparatus commonly employed in the manufacture of ice cream and known as ice cream freezers. Such an ice cream freezer is exemplified in United States Patent No. 2,210,366 to Godfrey et al., issued August 6, 1940. A preferred construction of the chiller 217, as adapted to the purposes of the present invention, is herein shown in Figs. 22 to 27, inclusive.

Referring to the above mentioned figures of the drawings, the chiller 217 provides a pair of tubular processing chambers arranged side by side and endwardly interconnected for continuous flow of the composition emulsion through the two chambers successively. Each of the chambers is formed by identical structure comprising a cylinder 218 enclosing the processing chamber and having a spaced outer cylinder or jacket 219 endwardly sealed thereto, the space between the cylinder 218 and the jacket 219 forming a refrigerant flow passage. A refrigerant inlet connection 220 and an outlet connection 221 are provided in the lower and upper sides respectively of the jacket 219 and are adapted for connection with suitable refrigerant circulating means (not shown). An insulation covering 222 preferably is provided about the jacket 219. Both cylinder assemblies are mounted upon a suitable base 223.

Each cylinder 218 is provided with a removable front end closure 224 secured by a screw-threaded nut 225. An inwardly extending axial stub shaft 226 is fixed to the closure 224. An outwardly extending eccentric pipe connection 227 is formed on the front end closure 224 and is provided with a passage therethrough to the interior of the cylinder 218. Each cylinder is provided with a removable cup-shaped rear end closure 228 having a lateral tubular branch 229 forming with the cup-shaped rear end closure a passage to the interior of the cylinder 218. The rear end closure 228 is held in position by a swinging clamp bar 230. The respective lateral branches 229 of the two rear end closures 228 are interconnected by a pipe 231 and coupling nut 232 to form a continuous enclosed passage between the two cylinders 218.

Each cylinder 218 is also provided with a rotatable agitator operatively positioned within the cylinder and comprising a pair of spaced bars 233 secured at their front ends to a bearing member 234 journaled upon the stub shaft 226 fixed to the front end closure 224. At their rear ends, the spaced bars 233 are secured to a plug 235 extending rearwardly of the bars 233 and having fixed thereon a tubular splined drive shaft 236. The drive shaft 236 extends through a bearing provided in the rear end closure 228 and through a free opening in the clamping bar 230. The bars 233 are spaced from the cylinder 218 and are provided with a plurality of radially extending pins 237 upon which a staggered series of blades 238 is loosely mounted and retained in position by rods 239 extending through holes provided in the ends of the pins 237 outwardly of the blades 238. In operation, the blades 238 maintain angular scraping contact with the inner surface of the cylinder 218.

Each of the two agitators is driven by a gear shaft 240 journaled in suitable bearings provided in the base 223 and having splined connection with the tubular drive shaft 236. A gear 241 is secured upon the gear shaft 240. A pinion (not shown) is positioned between the two spaced gears 241 and in driving engagement with both gears. The pinion is secured upon a shaft 242 having suitable bearings in the base 223 and having a drive pulley 243 secured upon its outer end, the pulley 243 being adapted for V belts 244 and driven by a motor (not shown) suitably mounted in the base 223.

The discharge pipe 207 leading from the emulsifier 200 is connected to the pipe connection 227 formed in the front end closure 224 of the first cylinder 218. The pipe connection 227 formed in the front end closure 224 of the second cylinder 218 is connected to an outlet pipe 245. The emulsion flowing from the emulsifier 200 through the pipe 207 is under pressure of the discharge from the composition control pump 116. The emulsion enters the front end of the first cylinder 218, passes continuously through its cooling and agitating chamber, then through the rear end cross connection 231 into the second cylinder 218 and through its cooling and agitating chamber to the front end outlet pipe 245.

The liquid emulsion enters the chiller 217 with a temperature of from 140° F. to 150° F. During its continuous passage through the cooling chambers, the agitation of the flowing emulsion promotes crystallization of the cooling fat, maintains a uniform dispersion of the serum therein, and effects uniformly progressive temperature reduction throughout its mass. As the fat progressively crystallizes into a plastic state, the emulsion phase relation of dispersed serum in continuous fat becomes stabilized. Continued temperature reduction and agitation further solidifies the fat while working the mass to attain smoothness of texture in the crystalline structure of the butter. The plastic emulsion is discharged from the chiller with a temperature substantially below the normal melting point of butter, preferably between 45° F. and 55° F.

Milk fat is a natural compound of glycerides of several fatty acids having widely different individual melting temperatures ranging from below 0° F. to 170° F. In normal milk and cream at animal temperature of approximately 100° F., the dispersed fat globules of composite glycerides are in viscous liquid state. By heating cream above 100° F., the composite fat becomes progressively more fluid as the higher melting glycerides are liquefied, and becomes more efficiently separable into the high fat concentration utilized in the present process. After breaking the cream emulsion and effecting the final separation of the fat and the serum in the serum separator 49, the hot fat is in amorphous fluid state and continues in that state through the addition of the preferably heated composition ingredients by either practice hereinbefore described, and finally into the chiller 217.

With the application of refrigeration to the hot butter emulsion flowing through the chiller 217, the several glycerides successively crystallize as the temperature is progressively lowered through their several melting points, and the composite fat becomes increasingly viscous until the emulsion is stabilized and discharged from the chiller as a plastic mass of butter in which a small proportion of the glycerides still are in liquid state. Agitation during the chilling period induces crystallization of the fat and also breaks the growing fat crystals into finely divided granular formations. During the latter part of the chilling period, when substantial crystallization has taken place, agitation effects a working intermovement of the plastic mass within the chiller by which the remaining amorphous liquid lower-melting glycerides and the minute particles of serum containing the composition ingredients are thoroughly interspersed within the granular fat structure.

Except for such influences as are had from inherent characteristics of the cream, or from the method of pasteurization or other treatment of the cream preliminary to the present process, the body and texture of the butter are determined by the degree of emulsification and by the amount of refrigeration and agitation to which the butter emulsion is subjected during the progressive crystallization period. The preferably constant agitation provided in the chiller 217 is designed to accomplish satisfactory mean results in performing its described functions. However, the agitating means may be provided with a variable speed drive of the type herein described for the composition control pump drive shown in Fig. 14, for varying the amount of agitation applied to the emulsion during its passage through the chiller 217. The degree of refrigeration may be varied at will by means of conventional refrigerant temperature controls associated with the chiller 217. The rate of flow of the emulsion through the chiller may be varied by adjustment of the speed of the composition control pump 116, thus varying the period of time during which the emulsion is chilled and agitated. Slight changes in these controlling conditions effect marked differences in the resulting body and texture of the butter.

Insufficient cooling of the butter in the chiller 217 produces weakness of body and coarseness of texture. Sharper cooling produces firmer body with finer fat crystals and closer texture. Extreme cooling hardens the butter objectionably. Insufficient agitation or working in the chiller 217 results in crumbly or resistant body and coarse texture, while excessive agitation makes a soft or rubbery body and greasy texture. Correct temperature and agitation in the chiller 217, as determined in practice by the characteristics of the cream being processed, produce the qualities of compact and readily spreadable body with fine waxy texture in the finished butter. The regulatory controls may be adjusted to obtain these qualities and to vary them in degree to meet the taste and demand of the market where the butter is sold for consumption, and also to secure the desired results with cream of variant conditions of age, and of breed, seasonal or geographic production, the latter factors being well recognized in conventional churning practice as influencing the quality of the butter.

A phenomenon of butter making, well known to butter producers, is that upon cessation of the final operation of working the plastic mass of butter in a conventional churn and worker, the then plastic butter will quickly "set" or harden, so that it is difficult to remove from the churn and pack unless done promptly. This has been described as an inherent physical process by which the fat reaches a state of crystallization equilibrium. Apparently the hardening results from the interattachment of the granular crystals in rigid formations which was prevented by their constant movement during the working operation. This "setting" occurs very rapidly immediately after working, and continues slowly through several hours. Butter makers take this into account in determining the amount of working to give their butter in the conventional churn and worker so that the finished product will have the desired body and texture. The conventional working operation requires great skill on the part of the churn operator.

This phenomenon is largely offset in the present process by subjecting the flow of butter from the chiller 217 to several mild working treatments by means of angular bends 246 in the discharge pipe 245 as shown in Fig. 28. Such angular changes of flow course introduce sufficient turbulence in the flowing butter to break up the progressively growing rigid formations and maintain the plasticity of the granular structure. The pipe bends may be supplemented by an annular baffle, indicated at 247 in Fig. 29, placed in the coupling 248 between sections of the pipe 245 to give added turbulence, if required in processing butter from cream having relatively hard fat. By these means, the body and texture determinations made in the chiller are preserved with only a slight setting of the butter after printing, and which latter is more desirable than otherwise in preventing de-formation of the printed butter in packaging.

Another adjunctive purpose may be served by the chiller 217 by introducing air or other gas into the second cooling and agitating chamber in the manner employed in the conventional ice cream freezer, such as described in the Godfrey Patent No. 2,210,366, and as indicated in Fig. 27 herein by the pipe 249 connecting into the chamber through the rear end closure 228 of the cylinder 218, for producing a whipped product with incorporated air or other gas. The chiller 217 may be so employed in producing certain of the spreads previously described herein.

Printing and packaging

The discharge pipe 245 terminates in an enlarged forming and extruding tube 250, as shown in Fig. 28, from which the plastic butter flowing from pipe 245, under pressure of the composition control pump discharge, is extruded through its open discharge end in the form of a continuously advancing bar having the cross dimensions of a standard print of butter. The forming tube 250 is made interchangeable with other similar tubes having discharge ends of different dimensions, so that the extruded bar may have selectively the standard cross dimensions of one pound prints, quarter pound prints, rolls, or any other customary shape of merchandising package. The pipe 245 may also be extended, as shown in Fig. 1, and provided with a three-way valve 251 by which the flow of butter may be diverted from the forming tube 250 to a branch discharge pipe 252 for filling tubs or boxes as commonly used for shipping or storing butter which is not immediately made into prints.

The continuous bar of butter extruded from the forming tube 250 is directed into a cutting machine 253 (see Fig. 30) which may be of any conventional design suitable to sever the bar into sections of standard print length. Such a cutting machine is exemplified in United States Patent No. 2,260,747 to Heft, issued October 28, 1941. Preferably the severed prints are carried by suitable conveying means to a conventional wrapping and cartoning machine 254 by which they are completely packaged for the consuming trade without manual handling. Such a combined wrapping and cartoning machine is exemplified in United States Patent No. 2,111,901 to Ness, issued March 28, 1938, wherein the prints of butter are wrapped in parchment paper and the wrapped prints are placed in waxed fiber cartons. However, the severed prints may be wrapped and cartoned by hand as discharged from the cutting machine 253, or may be wrapped by a conventional wrapping machine in place of the combination machine 254 and manually placed in cartons.

Upon approaching completion of an operating run in accordance with the practice hereinbefore described, and having separated and delivered to the emulsion breaker 11 the last of the supply of cream in the supply vat 1, it is then desirable to supply a stream of pure hot water to the emulsion breaker intake receptacle 9 in volume equivalent to the stream of separated cream normally flowing from the cream separator 6. The hot water may be so supplied by lifting the cover of the receptacle 9 and inserting a hose (not shown) connected with suitable hot water supply means (not shown). With continued operation of the emulsion breaker 11, and of all of the subsequent apparatus above described, the hot water follows after the broken cream and separated fat and forces the latter through the several subsequent steps of the process. By this means the product is normally processed to the end and substantially cleared from all of the apparatus. A small amount of diluted fat remaining at the end is discharged into a suitable container and added for reseparation to the supply of cream for the next operating run.

All of the apparatus, pipes and connections described herein are constructed for easy disassembling of all parts having contact with the product being processed for thorough cleaning after each run in accordance with the best sanitary practice for processing food products.

As set forth in the foregoing description, there is preferable advantage in the practice of the invention with continuity of flow of the product progressively through the several steps of the process from cream supply to finished butter. Such practice is especially adapted to the operation of a butter factory located in a cream producing area. However, other conditions of location or other products of manufacture may require practice of the invention with interruption of the process at an intermediate step, and the partially processed material held or transported for later resumption of the process. A butter factory may be located in a consumption center remote from cream producing areas. Cream receiving stations located in the producing areas may process cream to the production of dehydrated butter oil or the high fat fraction separated after breaking and reversing the emulsion, such intermediate product being packaged and transported to the factory for processing through the remaining steps to finished butter. Also, the process may be interrupted at intermediate steps after breaking the normal fat-in-serum emulsion and producing the reversed phase serum-in-fat mixture having its fat and serum phases in unstable readily separable relation, as may be convenient or required in preparation of the fat for use in making ice cream, dairy spreads and other dairy products containing butterfat. The appended claims comprehend practice of the successive steps of the process as set forth in the several claims both in continuous sequence and in interrupted sequence.

Example No. 1

The following description of a typical "run" is illustrative of the operating procedure in the production of butter from pasteurized sweet cream by the process of the present invention in accordance with the foregoing description.

Preliminary to starting the cream flow through the apparatus, a quantity of scalding hot water is run through the several machines as far as through the composition control pump for the purpose of heating the machines up to operating temperature. The hot water is drained from the apparatus through opened pipe connections and the latter replaced in readiness for operation.

The vat 1 is filled with pasteurized sweet cream having 35 per cent fat content. The cream is heated to a temperature of 170° F. and is then ready for processing. Meanwhile, the centrifugal separator 6 has been started in operation and brought up to operating speed, with its separating control adjusted to deliver concentrated cream having 78 per cent fat.

With the cream in vat 1 at the stated temperature, the separator supply pump 4 is put in operation. The pump 4 maintains a continuous flow of cream from the vat to the separator 6 at the rated capacity of the latter. The separator discharges the skim milk into a suitable container placed to receive it from the pipe 7.

The concentrated cream, having 78 per cent fat content, is delivered by the separator 6 in a continuous stream through the pipe 8 into the emulsion breaker intake receptacle 9. When the latter is about half filled with the concentrated cream, the emulsion breaker 11 is started in operation and begins pumping the concentrated cream from the receptacle 9 and discharging it through the breaker valve and return pipe 65 again into the receptacle 9. During this short period of recirculation of the cream, the breaker valve pressure is adjusted to approximately 1300 pounds per square inch, as indicated on the gauge 45, at which pressure the concentrated cream emulsion is broken, reversed in phase, and de-stabilized by its passage through the emulsion breaker valve.

For the present example of a typical run, it is assumed that the emulsion breaker 11 is a machine similar to that shown on page 231 of "Dairy Engineering," by Farrall, supra. With this machine in use, the above mentioned approximate pressure of 1300 pounds per square inch is suitable for processing sweet cream of northern winter production. Certain kinds of dry cow feed tend to harden the fat in cream produced from the milk from cows fed thereon, and in processing such sweet cream the required pressure may reach 1400 to 1500 pounds. Sweet cream produced from the milk from pasture-fed cows having relatively soft fat may require not more than 1200 pounds pressure. Sour cream, in which the stability of the serum phase has been somewhat lowered, may require not more than 1000 pounds pressure. A butter-making plant or creamery receives cream peculiar to the area in which it is located, and in practicing the present invention the emulsion breaker pressure required is determined by test of the cream produced in that area. Furthermore, as previously pointed out herein, other forms of emulsion breakers may be employed since the invention is not limited to any special or particular form of machine.

When the recirculated broken cream, together with the concentrated cream flowing from the separator 6, has filled the receptacle 9 and thereby caused the float valve 78 to throttle the return flow through pipe 65, the relief valve 79 is forced open as the emulsion breaker discharge pressure rises in the pipe 48, and the broken cream passes through the relief valve 79 into the serum separator 49. The few degrees of temperature of the cream, lost by radiation during its passage from the vat 1 to the emulsion breaker 11, are restored by the converted energy expended in forcing the cream through the breaker valve, and the broken cream enters the serum separator at a temperature of approximately 170° F.

A glazed opening is provided in the top portion of the serum separator 49 so that it may be observed when the latter is filled with the broken and reversed phase cream and the stratified fat fraction begins to flow from the top of the serum separator through pipe 63 to the composition control pump 116. As the confined discharge of liquid fat builds up pressure in the serum separator 49 to about 7 pounds per square inch as indicated by the gauge 255 in pipe 63, the other pressure relief valve 88 at the bottom of the serum separator is forced open and the stratified lower serum fraction in the serum separator begins to flow therefrom through pipe 64 back to the intake side of the separator supply pump 4.

The fat fraction discharged from the serum separator 49 in a normal run comprises 98 per cent of pure fat and 2 per cent of finely divided serum dispersed in the fat. This proportion provides a satisfactory fat concentration for introduction of the butter composition ingredients.

Prior to the beginning of the run, the required quantity of composition solution is prepared with the constituent ingredients in such calculated proportions as will produce, when added to fat, the required composition in the finished butter. For the presently described typical run, it is assumed that the finished butter will have the following composition, shown in percentage by weight:

| | |
|---|---|
| Butter fat | 80.1 |
| Curd (proteins) | 1.0 |
| Salt | 2.7 |
| Water | 16.2 |
| | 100.0 |

It is further assumed that a supply of pasteurized skim milk (serum) is at hand, containing 9 per cent of serum solids not fat (proteins), commonly termed "curd." From this basis, the required amount of composition solution and its proportionate amount of each contained ingredients may be calculated, as illustrated in the following table.

One hundred pounds of butter requires:

| | Fat | Curd | Salt | Water |
|---|---|---|---|---|
| Fat fraction (98% fat and 2% serum) | $\frac{80.1}{.98}$=81.73 lbs.=80.10 | .15 | | 1.48 |
| Composition solution | | | | |
| Skim milk (serum) (9% curd and 91% water) $\frac{1.}{.09}$=11.11 lbs. | | | | |
| Less serum in fat 1.63 lbs. | | | | |
| | 9.48 lbs.= | | | |
| Salt | 9.48 lbs.= 2.70 lbs.= | .85 | 2.70 | 8.63 |
| Water | 6.09 lbs.= | | | 6.09 |
| | 100.00 lbs.=80.10 | 1.00 | 2.70 | 16.20 |

The composition solution, comprising skim milk, salt and water in the above determined proportions, is made up in quantity necessary for the amount of cream being processed, and held in the vat 168 at pasteurizing temperature. Butter color as desired is added to the cream or to the composition solution, the quantity being negligible in the above calculation. A supply of the composition solution is maintained in the reservoir 161 during the run by the pump 170.

In order to apportion the relative volume of composition solution to be introduced into the fat fraction by the composition control pump 116, a gallon each of the fat fraction and of the composition solution are weighed. For the present example, it is assumed that a gallon of the fat fraction weighs 7.8 pounds and that a gallon of the composition solution weighs 8.6 pounds. As calculated above, 100 pounds of butter requires:

Fat fraction _____ 81.73 lbs. @ 7.8 lbs. per gal.=10.48 gals.
Composition solution _____ 18.27 lbs. @ 8.6 lbs. per gal.= 2.12 gals.

The ratio between the combined piston displacement in the fat pumping cylinders 117 and 118 of the composition control pump 116 and the piston displacement in the solution pumping cylinder 119 is determined as follows:

$$\frac{\text{Fat fraction—10.48 gals.}}{\text{Composition solution—2.12 gals.}} = \frac{4.94}{1} = \frac{1}{.202}$$

The adjusting cap 146 of the means provided for varying the piston stroke in cylinder 119 is then set for delivery of .202 gallon of composition solution for each gallon of the fat fraction passing through the composition control pump.

When the fat fraction flows from the serum separator 49 through the pipe 63 to the composition control pump 116, the latter is started in operation. The speed of the composition control pump 116 is regulated to maintain pressure in the fat fraction flowing to the pump of approximately 7 pounds per square inch, as indicated by the pressure gauge 255 connected to the pipe 63, thus maintaining the return flow through pipes 65 and 64 as previously described.

The liquid fat and intermixed solution flows under pressure from the composition control pump 116 through pipe 199, the emulsifier 200 and pipe 207 into the chiller 217, which latter is started in operation immediately after starting the composition control pump. The composition control pump discharge pressure, as indicated by the gauge 256 connected to the top closure of the emulsifier 200, is about 70 pounds per square inch when in full operation, such pressure being necessary to maintain the flow of the emulsion through the emulsifier, chiller, print-forming tube and their interconnections. The temperature of the emulsion entering the chiller 217 is between 140° F. and 150° F. The temperature is quickly lowered in the chiller, and as the emulsion crystallizes therein to a plastic state, its resistance to flow pressure increases.

For the present example, the conventional temperature control for the chiller refrigerant is regulated to maintain a refrigerant temperature of 20° F. The chiller agitators are operated at mean speed. Under these conditions, the emulsion flows continuously through the chiller 217, the angular discharge pipe 245 and the forming tube 250, emerging from the latter in a firm plastic bar of butter at about 45° F. temperature.

The extruded bar passes through the print-cutting machine 253 by which it is severed into prints. The prints are thereafter wrapped and packaged by hand or machine as previously described.

*Example No. 2*

The following description is illustrative of typical operating procedure in the production of dehydrated butter oil by the process of the present invention.

The procedure of Example No. 1 is followed to the flow of the fat fraction from the serum separator 49. The stream of hot fat flowing from the serum separator 49 through pipe 63 is conducted to the dehydrating centrifugal oil separator 90. This special type separator reduces the moisture content to a fractional per cent which is negligible for the preservation in storage and subsequent use of the butter oil.

The dehydrated oil is received from the separator 90 in containers suited to the subsequent use of the butter oil. If it is to be used after a relatively short period in refrigerated storage or transportation, it may be packaged in the ordinary tubs or boxes customarily used for bulk butter similarly stored or transported. For indefinite storage or transit without refrigeration, the oil should be packaged in sealed containers to prevent oxidation and contamination.

While a preferred embodiment of the invention has been described herein, it is to be understood that only such limitations on the invention are to be imposed as are pointed out in the appended claims.

I claim as my invention:

1. A process for manufacturing butter comprising; heating cream to a temperature at which the milk fat is substantially liquefied; separating the heated cream to produce a portion containing fat in high concentration; subjecting the concentrated cream to forces effective to break the normal fat-in-serum cream emulsion and produce a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; emulsifying the mixture of fat, serum and composition ingredients; and cooling, agitating and working the emulsion to effect crystallization of the fat, stabilization of the emulsion and granulation of the forming fat crystals for the production of butter.

2. A process for manufacturing butter comprising; heating cream to a temperature at which the milk fat is substantially liquefied; separating the heated cream to produce a portion containing fat in high concentration; subjecting the concentrated cream to forces effective to break the normal fat-in-serum cream emulsion and produce a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; and agitating, cooling and working the mixture to effect emulsification thereof, crystallization of the fat, stabilization of the emulsion and granulation of the forming fat crystals for the production of butter.

3. A process for manufacturing butter comprising; heating cream to a temperature at which the milk fat is substantially liquefied; separating the heated cream to produce a portion containing the fat in concentrated proportion greater than that desired in the butter; subjecting the concentrated cream to forces effective to break the normal fat-in-serum cream emulsion and produce a reversed phase serum-in-fat mixture; adding butter composition ingredients to the reversed phase mixture in amounts requisite to establish the proportion of fat desired in the butter; and cooling, agitating and working the mixture to effect emulsification of the mixture, crystallization of the fat, stabilization of the emulsion and granulation of the fat crystals for the production of butter.

4. A continuous process for manufacturing butter comprising by successive treatment of a flowing stream of component materials which comprises; heating cream to a temperature at which the milk fat is substantially liquefied; separating the heated cream to produce a portion containing the fat in concentrated proportion greater than that desired in the butter; subjecting the concentrated cream to forces effective to break the normal fat-in-serum cream emulsion and produce a reversed phase serum-in-fat mixture; adding butter composition ingredients to the reversed phase mixture in amounts requisite to establish the proportion of fat desired in the butter; emulsifying the mixture; and cooling, agitating and working the mixture to effect crystallization of the fat, stabilization of the emulsion and granulation of the fat crystals for the production of butter.

5. A process for manufacturing butter comprising; heating cream to a temperature at which the milk fat is substantially liquefied; separating the heated cream to produce a portion containing fat in high concentration; subjecting the concentrated cream to forces effective to break the normal fat-in-serum cream emulsion and produce a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; emulsifying the mixture of fat, serum and composition ingredients; cooling, agitating and working the emulsion to effect crystallization of the fat, stabilization of the emulsion, and granulation of the forming fat crystals for the production of butter; and passing the butter through a passage adapted to cause turbulence of flow.

6. A process for manufacturing butter comprising; heating cream to a temperature at which the milk fat is substantially liquefied; separating the heated cream to produce a portion containing fat in high concentration; subjecting the concentrated cream to forces effective to break the normal fat-in-serum emulsion and produce a reversed phase serum-in-fat mixture having its fat and serum phases in unstable readily separable relation; separating serum therefrom to further concentrate the fat in proportion approaching pure fat; substantially removing the remaining moisture from the further concentrated fat to procure dehydrated butter oil; storing the butter oil; reheating the butter oil to a temperature at which the fat is substantially liquefied; adding ingredients to the butter oil to produce a desired butter composition; emulsifying the composite mixture; and cooling, agitating and working the emulsion to crystallize the fat, to stabilize the emulsion and to granulate the fat crystals, whereby butter is produced.

7. A process for manufacturing butter by continuous treatment of a flowing stream of component materials comprising; heating cream to a temperature at which the milk fat is substantially liquefied; separating the heated cream to produce a portion containing fat in high concentration; subjecting the concentrated cream to forces effective to break the normal fat-in-serum cream emulsion and produce a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; emulsifying the mixture of fat, serum and composition ingredients; and cooling, agitating and working the emulsion to effect crystalization of the fat, stabilization of the emulsion and granulation of the forming fat crystals for the production of butter.

8. A continuous process for manufacturing butter by successive treatment of a flowing stream of component materials comprising; heating cream to a temperature at which the milk fat is substantially liquefied; separating the heated cream to produce a portion containing fat in high concentration; subjecting the concentrated cream to forces effective to break the normal fat-in-serum cream emulsion and produce a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; and agitating, cooling and working the mixture to effect emulsification thereof, crystallization of the fat, stabilization of the emulsion and granulation of the forming fat crystals for the production of butter.

9. A continuous process for manufacturing butter by successive treatment of a flowing stream of component materials comprising; heating cream to a temperature at which the milk fat is substantially liquefied; separating the heated cream to produce a portion containing fat in high concentration; subjecting the concentrated cream to forces effective to break the normal fat-in-serum cream emulsion and produce a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; agitating, cooling and working the mixture to effect emulsification thereof, crystallization of the fat, stabilization of the emulsion and granulation of the forming fat crystals for the production of butter; and passing the butter through a passage causing turbulence of flow thereof.

10. A process for manufacturing butter comprising; heating cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a more concentrated fat fraction and a serum fraction, and withdrawing the serum fraction; adding ingredients to the more concentrated fat fraction to produce a desired butter composition; emulsifying the composite mixture; and cooling, agitating and working the emulsion to crystallize the fat, to stabilize the emulsion and to granulate the fat crystals, whereby butter is produced.

11. A process for manufacturing butter comprising; heating cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a more concentrated fat fraction and a serum fraction, and withdrawing the serum fraction; adding ingredients to the more concentrated fat fraction to produce a desired butter composition; and agitating, cooling and working the mixture to emulsify the mixture, to crystallize the fat, to stabilize the emulsion and to granulate the fat crystals, whereby butter is produced.

12. A process for manufacturing butter comprising; heating cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; separating serum therefrom to further concentrate the fat in greater proportion than is desired in the butter; adding ingredients to the further concentrated fat portion to produce a desired butter composition; emulsifying the composite mixture of fat portion and added ingredients; cooling, agitating and working the emulsion to crystallize the fat, to stabilize the emulsion and to granulate the fat crystals, whereby plastic butter is produced; and passing the plastic butter through a passage adapted to cause turbulence of flow.

13. A continuous process for manufacturing butter by successive treatment of a flowing stream of component materials comprising; heating cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a more concentrated fat fraction and a serum fraction, and withdrawing the serum fraction; adding ingredients to the more concentrated fat fraction to produce a desired butter composition; emulsifying the composite mixture; and cooling, agitating and working the emulsion to crystallize the fat, to stabilize the emulsion and to granulate the fat crystals, whereby butter is produced.

14. A continuous process for manufacturing butter by successive treatment of a flowing stream of component materials comprising; heating cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a more concentrated fat fraction and a serum fraction, and withdrawing the serum fraction; adding ingredients to the more concentrated fat fraction to produce a desired butter composition; and agitating, cooling and working the mixture to emulsify the mixture, to crystallize the fat, to stabilize the emulsion and to granulate the fat crystals, whereby butter is produced.

15. A continuous process for manufacturing butter by successive treatment of a flowing stream of component materials comprising; heating cream to fat-melting temperature, centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a more concentrated fat fraction and a serum fraction, and withdrawing the serum fraction; adding ingredients to the more concentrated fat fraction to produce a desired butter composition; emulsifying the composite mixture; cooling, agitating and working the emulsion to crystallize the fat, to stabilize the emulsion and to granulate the fat crystals, whereby plastic butter is produced; and passing the plastic butter through a passage adapted to cause turbulence of flow.

16. A continuous process for manufacturing butter by successive treatment of a flowing stream of component materials comprising; heating cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a more concentrated fat fraction and a serum fraction, and withdrawing the serum fraction; passing the more concentrated fat fraction through a vacuum chamber to remove undesirable odors; adding ingredients to the more concentrated fat fraction to produce a desired butter composition; emulsifying the composite mixture; and cooling, agitating and working the emulsion to crystallize the fat, to stabilize the emulsion and to granulate the fat crystals, whereby butter is produced.

17. A process for manufacturing butter comprising; heating cream to fat-melting temperature; centrifuging the heated cream to produce a portion thereof having high fat concentration; causing the concentrated cream to flow between closely adjacent surfaces moving relatively at high velocity whereby the normal fat-in-serum cream emulsion is broken and converted to a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; emulsifying the mixture of fat, serum and composition ingredients; and cooling, agitating and working the emulsion to effect crystallization of the fat, stabilization of the emulsion and granulation of the forming fat crystals for the production of butter.

18. A continuous process for manufacturing butter by successive treatment of a flowing stream of component materials comprising; heating cream to fat-melting temperature; centrifuging the heated cream to produce a portion thereof having high fat concentration; causing the concentrated cream to flow between closely adjacent surfaces moving relatively at high velocity whereby the normal fat-in-serum cream emulsion is broken and converted to a reversed phase serum-in-fat mixture having its fat and serum phases in unstable readily separable relation; separating serum therefrom to further concentrate the fat in greater proportion than is desired in the butter; adding butter composition ingredients to the concentrated fat portion in amount requisite to establish the proportion of fat desired in the butter; emulsifying the mixture of fat, serum and composition ingredients; and cooling, agitating and working the emulsion to effect crystallization of the fat, stabilization of the emulsion and granulation of the forming fat crystals for the production of butter.

19. A process for manufacturing butter oil comprising; heating cream to a temperature at which the milk fat is substantially liquefied; separating the heated cream to produce a portion containing fat in high concentration; subjecting the concentrated cream to forces effective to break the normal fat-in-serum emulsion and produce a reversed phase serum-in-fat mixture having its fat and serum phases in unstable readily separable relation; separating serum therefrom to further concentrate the fat in proportion approaching pure fat; and finally separating the further concentrated fat portion to remove substantially the remaining serum and produce dehydrated butter oil.

20. A process for treating cream to procure butter oil therefrom which comprises; heating cream having a fat concentration in excess of 70 per cent to fat-melting temperature; breaking the normal fat-in-serum phase emulsion of said cream to produce a reversed serum-in-fat phase mixture wherein the fat content and the serum content are in unstable separable relationship; and then separating the butter oil therefrom.

21. A continuous process for manufacturing butter oil by successive treatment of a flowing stream of cream comprising; heating the cream to fat-melting temperature; separating the heated cream to produce a portion thereof having high fat concentration; subjecting the concentrated cream to forces effective to break the normal fat-in-serum cream emulsion and produce a reversed phase serum-in-fat mixture having its fat and serum phases in unstable readily separable relation; separating the reversed phase mixture into a further concentrated fat fraction and a serum fraction; and separating the further concentrated fat fraction to remove substantially the remaining serum and produce dehydrated butter oil.

22. A process for manufacturing butter oil comprising; heating cream to a temperature at which the milk fat is substantially liquefied; separating the heated cream to produce a portion containing fat in high concentration; subjecting the concentrated cream to extreme flow velocity whereby the normal fat-in-serum cream emulsion is broken and converted to a reversed phase serum-in-fat mixture having its fat and serum phases in unstable readily separable relation; separating serum therefrom to further concentrate the fat in proportion approaching pure fat; and finally separating the further concentrated fat portion to remove substantially the remaining serum and produce dehydrated butter oil.

23. A process for treating cream having high fat concentration to reverse its normal emulsion phase relation which comprises; heating the cream to at least fat-melting temperature; flowing a stream of said cream at extreme velocity through a restricted passageway whereby the normal continuous serum phase is disrupted and dispersed and the normal dispersed fat phase is merged in continuous phase containing the dispersed serum; and then separating the fat fraction from the serum fraction.

24. A continuous process for manufacturing butter oil by successive treatment of a flowing stream of cream comprising; heating the cream to fat-melting temperature; centrifuging the heated cream to produce a portion thereof having high fat concentration; subjecting the concentrated cream to extreme flow velocity whereby the normal fat-in-serum cream emulsion is broken and converted to a reversed phase serum-in-fat mixture having its fat and serum phases in unstable readily separable relation; causing the reversed phase mixture to stratify into a further concentrated fat fraction and a serum fraction, and withdrawing the serum fraction; passing the further concentrated fat fraction through a vacuum chamber to remove undesirable odors; and separating the further concentrated fat fraction to remove substantially the remaining serum and produce dehydrated butter oil.

25. A process for manufacturing butter oil comprising; heating cream to fat-melting temperature; centrifuging the heated cream to produce a portion thereof having high fat concentration; causing the concentrated cream to flow between closely adjacent surfaces moving relatively at high velocity whereby the normal fat-in-serum cream emulsion is broken and converted to a reversed phase serum-in-fat mixture having its fat and serum phases in unstable readily separable relation; separating serum therefrom to further concentrate the fat in proportion approaching pure fat; and finally separating the further concentrated fat portion to remove substantially the remaining serum and produce dehydrated butter oil.

26. A continuous process for treating a flowing stream of cream to facilitate the separation therefrom of the contained fat comprising; heating the cream to a temperature at which the milk fat is substantially liquefied; separating the heated cream to produce a portion containing fat in high concentration; and subjecting the concentrated cream to forces effective to break the normal fat-in-serum emulsion and produce a reversed phase serum-in-fat mixture having its fat and serum phases in unstable readily separable relation.

27. A process for treating cream to facilitate the separation therefrom of the contained fat comprising; heating the cream to fat-melting temperature; centrifuging the heated cream to produce a portion thereof having high fat concentration; and subjecting the concentrated cream to extreme flow velocity whereby the normal fat-in-serum emulsion is broken and converted to a reversed phase serum-in-fat mixture having its fat and serum phases in unstable readily separable relation.

28. A process for treating cream to facilitate the separation therefrom of the contained fat comprising; heating the cream to fat-melting temperature; centrifuging the heated cream to produce a portion thereof having high fat concentration; and causing the concentrated cream to flow between closely adjacent surfaces moving relatively at high velocity whereby the normal fat-in-serum cream emulsion is broken and converted to a reversed phase serum-in-fat mixture having its fat and serum phases in unstable readily separable relation.

29. A process for treating a flowing stream of cream having high fat concentration to facilitate the separation of the fat content which comprises; heating the cream to at least fat-melting temperature; and subjecting the heated cream to forces effective to break the normal fat-in-serum emulsion and produce a reversed phase serum-in-fat mixture having its fat and serum phases in unstable readily separable relation.

30. A process for treating a flowing stream of cream having high fat concentration to facilitate the separation of the fat, comprising subjecting the concentrated cream to forces effective to break the normal fat-in-serum emulsion and produce a reversed phase serum-in-fat mixture having its fat and serum phases in unstable readily separable relation.

31. A process for treating cream having high fat concentration to facilitate the separation of the fat, comprising flowing the cream through a restricted passage at extreme velocity whereby the normal fat-in-serum emulsion is broken and converted to a reversed phase serum-in-fat mixture having its fat and serum phases in unstable readily separable relation.

32. A process for treating cream having high fat concentration to reverse its normal emulsion phase relation, comprising flowing a stream of the cream between closely adjacent surfaces moving relatively at high velocity whereby the normally continuous serum phase is disrupted and dispersed and the normally dispersed fat phase is merged in continuous phase containing the dispersed serum.

ARTHUR W. FARRALL.